US008687349B2

(12) United States Patent
Truebenbach

(10) Patent No.: US 8,687,349 B2
(45) Date of Patent: Apr. 1, 2014

(54) BULK TRANSFER OF STORAGE DEVICES USING MANUAL LOADING

(75) Inventor: Eric L. Truebenbach, Sudbury, MA (US)

(73) Assignee: Teradyne, Inc., North Reading, MA (US)

( * ) Notice: Subject to any disclaimer, the term of this patent is extended or adjusted under 35 U.S.C. 154(b) by 252 days.

(21) Appl. No.: 12/840,399

(22) Filed: Jul. 21, 2010

(65) Prior Publication Data

US 2012/0023370 A1     Jan. 26, 2012

(51) Int. Cl.
| | |
|---|---|
| *H05K 5/00* | (2006.01) |
| *H05K 7/00* | (2006.01) |
| *G06F 7/00* | (2006.01) |
| *G11B 21/08* | (2006.01) |
| *G11B 7/085* | (2006.01) |

(52) U.S. Cl.
USPC .............. 361/679.01; 361/679.33; 700/112; 700/213; 700/214; 369/30.48

(58) Field of Classification Search
USPC ........ 361/724–728, 679.01, 679.33; 700/112, 700/213, 214; 369/30.48
See application file for complete search history.

(56) References Cited

U.S. PATENT DOCUMENTS

| | | | |
|---|---|---|---|
| 557,186 | A | 3/1896 | Cahill |
| 2,224,407 | A | 12/1940 | Passur |
| 2,380,026 | A | 7/1945 | Clarke |
| 2,631,775 | A | 3/1953 | Gordon |
| 2,635,524 | A | 4/1953 | Jenkins |
| 3,120,166 | A | 2/1964 | Lyman |
| 3,360,032 | A | 9/1965 | Sherwood |
| 3,364,838 | A | 1/1968 | Bradley |
| 3,517,601 | A | 6/1970 | Courchesne |
| 3,845,286 | A | 10/1974 | Aronstein et al. |
| 4,067,459 | A  * | 1/1978 | Rozengauz et al. .......... 414/269 |
| 4,147,299 | A | 4/1979 | Freeman |
| 4,233,644 | A | 11/1980 | Hwang et al. |
| 4,336,748 | A | 6/1982 | Martin et al. |

(Continued)

FOREIGN PATENT DOCUMENTS

| | | |
|---|---|---|
| AU | 583716 | 5/1989 |
| CN | 1177187 | 3/1998 |

(Continued)

OTHER PUBLICATIONS

Abraham et al., "Thermal Proximity Imaging of Hard-Disk Substrates", IEEE Transactions on Mathematics 36:3997-4004, Nov. 2000.

(Continued)

*Primary Examiner* — Adrian S Wilson
(74) *Attorney, Agent, or Firm* — Fish & Richardson P.C.

(57) ABSTRACT

A storage device transfer station is provided for transferring storage devices from a human operator to automated machinery for testing. The storage device transfer station includes a plurality of slots each capable of holding a storage device. The plurality of slots is arranged in at least one field, and the field is arranged between two parallel planes. Each slot has a first open end and a second open end, such that each open end is accessible for loading and unloading a storage device. The first open ends are accessible at a first plane of the two parallel planes and the second open ends are accessible at a second plane of the two parallel planes.

29 Claims, 8 Drawing Sheets

(56) References Cited

U.S. PATENT DOCUMENTS

| | | | |
|---|---|---|---|
| 4,379,259 A | 4/1983 | Varadi et al. |
| 4,477,127 A | 10/1984 | Kume |
| 4,495,545 A | 1/1985 | Dufresne et al. |
| 4,526,318 A | 7/1985 | Fleming et al. |
| 4,546,901 A * | 10/1985 | Buttarazzi | 221/10 |
| 4,620,248 A | 10/1986 | Gitzendanner |
| 4,648,007 A | 3/1987 | Garner |
| 4,654,732 A | 3/1987 | Mesher |
| 4,665,455 A | 5/1987 | Mesher |
| 4,683,424 A | 7/1987 | Cutright et al. |
| 4,685,303 A | 8/1987 | Branc et al. |
| 4,688,124 A | 8/1987 | Scribner et al. |
| 4,713,714 A | 12/1987 | Gatti et al. |
| 4,739,444 A | 4/1988 | Zushi et al. |
| 4,754,397 A | 6/1988 | Varaiya et al. |
| 4,768,285 A | 9/1988 | Woodman, Jr. |
| 4,778,063 A | 10/1988 | Ueberreiter |
| 4,801,234 A | 1/1989 | Cedrone |
| 4,809,881 A | 3/1989 | Becker |
| 4,817,273 A | 4/1989 | Lape et al. |
| 4,817,934 A | 4/1989 | McCormick et al. |
| 4,844,679 A * | 7/1989 | Teranishi | 414/331.05 |
| 4,851,965 A | 7/1989 | Gabuzda et al. |
| 4,881,591 A | 11/1989 | Rignall |
| 4,888,549 A | 12/1989 | Wilson et al. |
| 4,911,281 A | 3/1990 | Jenkner |
| 4,932,826 A * | 6/1990 | Moy et al. | 414/277 |
| 4,937,690 A * | 6/1990 | Yamashita et al. | 360/92.1 |
| 4,967,155 A | 10/1990 | Magnuson |
| 5,012,187 A | 4/1991 | Littlebury |
| 5,045,960 A | 9/1991 | Eding |
| 5,061,630 A | 10/1991 | Knopf et al. |
| 5,119,270 A | 6/1992 | Bolton et al. |
| 5,122,914 A | 6/1992 | Hanson |
| 5,127,684 A | 7/1992 | Klotz et al. |
| 5,128,813 A | 7/1992 | Lee |
| 5,136,395 A | 8/1992 | Ishii et al. |
| 5,143,193 A * | 9/1992 | Geraci | 194/212 |
| 5,158,132 A | 10/1992 | Guillemot |
| 5,168,424 A | 12/1992 | Bolton et al. |
| 5,171,183 A | 12/1992 | Pollard et al. |
| 5,173,819 A | 12/1992 | Takahashi et al. |
| 5,176,202 A | 1/1993 | Richard |
| 5,205,132 A | 4/1993 | Fu |
| 5,206,772 A | 4/1993 | Hirano et al. |
| 5,207,613 A | 5/1993 | Ferchau et al. |
| 5,210,680 A | 5/1993 | Scheibler |
| 5,237,484 A | 8/1993 | Ferchau et al. |
| 5,263,537 A | 11/1993 | Plucinski et al. |
| 5,269,698 A | 12/1993 | Singer |
| 5,295,392 A | 3/1994 | Hensel et al. |
| 5,309,323 A | 5/1994 | Gray et al. |
| 5,325,263 A | 6/1994 | Singer et al. |
| 5,336,030 A * | 8/1994 | Ostwald et al. | 414/277 |
| 5,349,486 A | 9/1994 | Sugimoto et al. |
| 5,368,072 A | 11/1994 | Cote |
| 5,374,395 A | 12/1994 | Robinson et al. |
| 5,379,229 A | 1/1995 | Parsons et al. |
| 5,398,058 A | 3/1995 | Hattori |
| 5,412,534 A | 5/1995 | Cutts et al. |
| 5,414,591 A | 5/1995 | Kimura et al. |
| 5,426,581 A | 6/1995 | Kishi et al. |
| 5,469,037 A | 11/1995 | McMurtrey, Sr. et al. |
| 5,471,561 A * | 11/1995 | Cowgill et al. | 700/247 |
| 5,477,416 A | 12/1995 | Schkrohowsky et al. |
| 5,479,581 A * | 12/1995 | Kleinschnitz | 700/247 |
| 5,484,012 A | 1/1996 | Hiratsuka |
| 5,486,681 A | 1/1996 | Dagnac et al. |
| 5,491,610 A | 2/1996 | Mok et al. |
| 5,543,727 A | 8/1996 | Bushard et al. |
| 5,546,250 A | 8/1996 | Diel |
| 5,557,186 A | 9/1996 | McMurtrey, Sr. et al. |
| 5,563,768 A | 10/1996 | Perdue |
| 5,570,740 A | 11/1996 | Flores et al. |
| 5,584,396 A * | 12/1996 | Schmitt | 211/26 |
| 5,593,380 A | 1/1997 | Bittikofer |
| 5,601,141 A | 2/1997 | Gordon et al. |
| 5,604,662 A | 2/1997 | Anderson et al. |
| 5,610,893 A | 3/1997 | Soga et al. |
| 5,617,430 A | 4/1997 | Angelotti et al. |
| 5,644,705 A | 7/1997 | Stanley |
| 5,646,918 A | 7/1997 | Dimitri et al. |
| 5,654,846 A | 8/1997 | Wicks et al. |
| 5,673,029 A | 9/1997 | Behl et al. |
| 5,694,290 A | 12/1997 | Chang |
| 5,700,125 A * | 12/1997 | Falace et al. | 414/276 |
| 5,718,627 A | 2/1998 | Wicks |
| 5,718,628 A | 2/1998 | Nakazato et al. |
| 5,731,928 A | 3/1998 | Jabbari et al. |
| 5,751,549 A | 5/1998 | Eberhardt et al. |
| 5,754,365 A | 5/1998 | Beck et al. |
| 5,761,032 A | 6/1998 | Jones |
| 5,793,610 A | 8/1998 | Schmitt et al. |
| 5,811,678 A | 9/1998 | Hirano |
| 5,812,761 A | 9/1998 | Seki et al. |
| 5,819,842 A | 10/1998 | Potter et al. |
| 5,831,525 A | 11/1998 | Harvey |
| 5,851,143 A | 12/1998 | Hamid |
| 5,859,409 A | 1/1999 | Kim et al. |
| 5,859,540 A | 1/1999 | Fukumoto |
| 5,862,037 A | 1/1999 | Behl |
| 5,870,630 A | 2/1999 | Reasoner et al. |
| 5,870,732 A * | 2/1999 | Fisher et al. | 1/1 |
| 5,886,639 A | 3/1999 | Behl et al. |
| 5,890,959 A | 4/1999 | Pettit et al. |
| 5,912,799 A | 6/1999 | Grouell et al. |
| 5,913,926 A | 6/1999 | Anderson et al. |
| 5,914,856 A | 6/1999 | Morton et al. |
| 5,927,386 A | 7/1999 | Lin |
| 5,956,301 A | 9/1999 | Dimitri et al. |
| 5,959,834 A | 9/1999 | Chang |
| 5,999,356 A * | 12/1999 | Dimitri et al. | 360/71 |
| 5,999,365 A | 12/1999 | Hasegawa et al. |
| 6,000,623 A | 12/1999 | Blatti et al. |
| 6,005,404 A | 12/1999 | Cochran et al. |
| 6,005,770 A | 12/1999 | Schmitt |
| 6,008,636 A | 12/1999 | Miller et al. |
| 6,008,984 A | 12/1999 | Cunningham et al. |
| 6,011,689 A | 1/2000 | Wrycraft |
| 6,031,717 A | 2/2000 | Baddour et al. |
| 6,034,870 A | 3/2000 | Osborn et al. |
| 6,042,348 A | 3/2000 | Aakalu et al. |
| 6,045,113 A | 4/2000 | Itakura |
| 6,055,814 A | 5/2000 | Song |
| 6,059,509 A * | 5/2000 | Ostwald | 414/277 |
| 6,066,822 A | 5/2000 | Nemoto et al. |
| 6,067,225 A | 5/2000 | Reznikov et al. |
| 6,069,792 A | 5/2000 | Nelik |
| 6,084,768 A | 7/2000 | Bologna |
| 6,094,342 A | 7/2000 | Dague et al. |
| 6,104,607 A | 8/2000 | Behl |
| 6,115,250 A | 9/2000 | Schmitt |
| 6,122,131 A | 9/2000 | Jeppson |
| 6,122,232 A | 9/2000 | Schell et al. |
| 6,124,707 A | 9/2000 | Kim et al. |
| 6,130,800 A * | 10/2000 | Ostwald | 360/92.1 |
| 6,130,817 A | 10/2000 | Flotho et al. |
| 6,144,553 A | 11/2000 | Hileman et al. |
| 6,166,901 A | 12/2000 | Gamble et al. |
| 6,169,413 B1 | 1/2001 | Pack et al. |
| 6,169,930 B1 | 1/2001 | Blachek et al. |
| 6,177,805 B1 | 1/2001 | Pih |
| 6,178,835 B1 | 1/2001 | Orriss et al. |
| 6,181,557 B1 | 1/2001 | Gatti |
| 6,185,065 B1 | 2/2001 | Hasegawa et al. |
| 6,185,097 B1 | 2/2001 | Behl |
| 6,188,191 B1 | 2/2001 | Frees et al. |
| 6,192,282 B1 | 2/2001 | Smith et al. |
| 6,193,339 B1 | 2/2001 | Behl et al. |
| 6,209,842 B1 | 4/2001 | Anderson et al. |
| 6,227,516 B1 | 5/2001 | Webster, Jr. et al. |
| 6,229,275 B1 | 5/2001 | Yamamoto |
| 6,229,667 B1 * | 5/2001 | Ostwald | 360/92.1 |
| 6,231,145 B1 | 5/2001 | Liu |

(56) References Cited

U.S. PATENT DOCUMENTS

| | | |
|---|---|---|
| 6,233,148 B1 | 5/2001 | Shen |
| 6,236,563 B1 | 5/2001 | Buican et al. |
| 6,247,944 B1 | 6/2001 | Bolognia et al. |
| 6,249,824 B1 | 6/2001 | Henrichs |
| 6,252,769 B1 | 6/2001 | Tullstedt et al. |
| 6,262,863 B1 | 7/2001 | Ostwald et al. |
| 6,272,007 B1 | 8/2001 | Kitlas et al. |
| 6,272,767 B1 | 8/2001 | Botruff et al. |
| 6,281,677 B1 | 8/2001 | Cosci et al. |
| 6,282,501 B1 | 8/2001 | Assouad |
| 6,285,524 B1 | 9/2001 | Boigenzahn et al. |
| 6,286,078 B1 * | 9/2001 | Fuld ............................ 711/111 |
| 6,289,678 B1 | 9/2001 | Pandolfi |
| 6,297,950 B1 | 10/2001 | Erwin |
| 6,298,672 B1 | 10/2001 | Valicoff, Jr. |
| 6,302,714 B1 | 10/2001 | Bolognia et al. |
| 6,304,839 B1 | 10/2001 | Ho et al. |
| 6,307,386 B1 | 10/2001 | Fowler et al. |
| 6,327,150 B1 | 12/2001 | Levy et al. |
| 6,330,154 B1 | 12/2001 | Fryers et al. |
| 6,351,379 B1 | 2/2002 | Cheng |
| 6,354,792 B1 | 3/2002 | Kobayashi et al. |
| 6,356,409 B1 | 3/2002 | Price et al. |
| 6,356,415 B1 | 3/2002 | Kabasawa |
| 6,384,995 B1 | 5/2002 | Smith |
| 6,388,437 B1 | 5/2002 | Wolski et al. |
| 6,388,875 B1 | 5/2002 | Chen |
| 6,388,878 B1 | 5/2002 | Chang |
| 6,389,225 B1 | 5/2002 | Malinoski et al. |
| 6,411,584 B2 | 6/2002 | Davis et al. |
| 6,421,236 B1 | 7/2002 | Montoya et al. |
| 6,434,000 B1 | 8/2002 | Pandolfi |
| 6,434,498 B1 | 8/2002 | Ulrich et al. |
| 6,434,499 B1 | 8/2002 | Ulrich et al. |
| 6,456,498 B1 * | 9/2002 | Larson et al. ............... 361/752 |
| 6,464,080 B1 | 10/2002 | Morris et al. |
| 6,467,153 B2 | 10/2002 | Butts et al. |
| 6,473,297 B1 | 10/2002 | Behl et al. |
| 6,473,301 B1 | 10/2002 | Levy et al. |
| 6,476,627 B1 | 11/2002 | Pelissier et al. |
| 6,477,044 B2 | 11/2002 | Foley et al. |
| 6,477,442 B1 | 11/2002 | Valerino, Sr. |
| 6,480,380 B1 | 11/2002 | French et al. |
| 6,480,382 B2 | 11/2002 | Cheng |
| 6,487,071 B1 | 11/2002 | Tata et al. |
| 6,489,793 B2 | 12/2002 | Jones et al. |
| 6,494,663 B2 | 12/2002 | Ostwald et al. |
| 6,525,933 B2 | 2/2003 | Eland |
| 6,526,841 B1 | 3/2003 | Wanek et al. |
| 6,535,384 B2 | 3/2003 | Huang |
| 6,537,013 B2 | 3/2003 | Emberty et al. |
| 6,544,309 B1 | 4/2003 | Hoefer et al. |
| 6,546,445 B1 | 4/2003 | Hayes |
| 6,553,532 B1 | 4/2003 | Aoki |
| 6,560,107 B1 | 5/2003 | Beck et al. |
| 6,565,163 B2 | 5/2003 | Behl et al. |
| 6,566,859 B2 | 5/2003 | Wolski et al. |
| 6,567,266 B2 | 5/2003 | Ives et al. |
| 6,570,734 B2 | 5/2003 | Ostwald et al. |
| 6,577,586 B1 | 6/2003 | Yang et al. |
| 6,577,687 B2 | 6/2003 | Hall et al. |
| 6,618,254 B2 | 9/2003 | Ives |
| 6,626,846 B2 | 9/2003 | Spencer |
| 6,628,518 B2 | 9/2003 | Behl et al. |
| 6,635,115 B1 | 10/2003 | Fairbairn et al. |
| 6,639,879 B2 * | 10/2003 | Plutt et al. ............... 369/30.45 |
| 6,640,235 B1 | 10/2003 | Anderson |
| 6,644,982 B1 | 11/2003 | Ondricek et al. |
| 6,651,192 B1 | 11/2003 | Viglione et al. |
| 6,654,240 B1 | 11/2003 | Tseng et al. |
| 6,679,128 B2 | 1/2004 | Wanek et al. |
| 6,693,757 B2 | 2/2004 | Hayakawa et al. |
| 6,741,529 B1 | 5/2004 | Getreuer |
| 6,746,648 B1 | 6/2004 | Mattila et al. |
| 6,751,093 B1 | 6/2004 | Hsu et al. |
| 6,754,082 B1 * | 6/2004 | Ding et al. ................... 361/727 |
| 6,791,785 B1 | 9/2004 | Messenger et al. |
| 6,791,799 B2 | 9/2004 | Fletcher |
| 6,798,651 B2 | 9/2004 | Syring et al. |
| 6,798,972 B1 | 9/2004 | Ito et al. |
| 6,801,834 B1 | 10/2004 | Konshak et al. |
| 6,806,700 B2 | 10/2004 | Wanek et al. |
| 6,811,427 B2 | 11/2004 | Garrett et al. |
| 6,826,046 B1 | 11/2004 | Muncaster et al. |
| 6,830,372 B2 | 12/2004 | Liu et al. |
| 6,832,929 B2 | 12/2004 | Garrett et al. |
| 6,861,861 B2 | 3/2005 | Song et al. |
| 6,862,173 B1 | 3/2005 | Konshak et al. |
| 6,867,939 B2 | 3/2005 | Katahara et al. |
| 6,892,328 B2 | 5/2005 | Klein et al. |
| 6,904,479 B1 | 6/2005 | Hall et al. |
| 6,908,330 B2 | 6/2005 | Garrett et al. |
| 6,928,336 B2 | 8/2005 | Peshkin et al. |
| 6,937,432 B2 | 8/2005 | Sri-Jayantha et al. |
| 6,957,291 B2 | 10/2005 | Moon et al. |
| 6,965,811 B2 | 11/2005 | Dickey et al. |
| 6,974,017 B2 | 12/2005 | Oseguera |
| 6,976,190 B1 | 12/2005 | Goldstone |
| 6,980,381 B2 | 12/2005 | Gray et al. |
| 6,982,872 B2 | 1/2006 | Behl et al. |
| 7,006,325 B2 | 2/2006 | Emberty et al. |
| 7,039,924 B2 | 5/2006 | Goodman et al. |
| 7,054,150 B2 | 5/2006 | Orriss et al. |
| 7,070,323 B2 | 7/2006 | Wanek et al. |
| 7,076,391 B1 | 7/2006 | Pakzad et al. |
| 7,077,614 B1 | 7/2006 | Hasper et al. |
| 7,088,541 B2 | 8/2006 | Orriss et al. |
| 7,092,251 B1 | 8/2006 | Henry |
| 7,106,582 B2 | 9/2006 | Albrecht et al. |
| 7,123,477 B2 | 10/2006 | Coglitore et al. |
| 7,126,777 B2 | 10/2006 | Flechsig et al. |
| 7,130,138 B2 | 10/2006 | Lum et al. |
| 7,134,553 B2 | 11/2006 | Stephens |
| 7,139,145 B1 | 11/2006 | Archibald et al. |
| 7,164,579 B2 | 1/2007 | Muncaster et al. |
| 7,167,360 B2 | 1/2007 | Inoue et al. |
| 7,181,458 B1 | 2/2007 | Higashi |
| 7,200,008 B1 * | 4/2007 | Bhugra ........................ 361/724 |
| 7,203,021 B1 | 4/2007 | Ryan et al. |
| 7,203,060 B2 | 4/2007 | Kay et al. |
| 7,206,201 B2 | 4/2007 | Behl et al. |
| 7,216,968 B2 | 5/2007 | Smith et al. |
| 7,219,028 B2 | 5/2007 | Bae et al. |
| 7,219,273 B2 | 5/2007 | Fisher et al. |
| 7,227,746 B2 | 6/2007 | Tanaka et al. |
| 7,232,101 B2 | 6/2007 | Wanek et al. |
| 7,243,043 B2 | 7/2007 | Shin |
| 7,248,467 B2 | 7/2007 | Sri-Jayantha et al. |
| 7,251,544 B2 * | 7/2007 | Christie, Jr. ................ 700/214 |
| 7,259,966 B2 | 8/2007 | Connelly, Jr. et al. |
| 7,273,344 B2 | 9/2007 | Ostwald et al. |
| 7,280,353 B2 | 10/2007 | Wendel et al. |
| 7,289,885 B2 | 10/2007 | Basham et al. |
| 7,304,855 B1 | 12/2007 | Milligan et al. |
| 7,315,447 B2 | 1/2008 | Inoue et al. |
| 7,349,205 B2 | 3/2008 | Hall et al. |
| 7,353,524 B1 | 4/2008 | Lin et al. |
| 7,375,923 B2 * | 5/2008 | DeCenzo et al. ........... 360/97.13 |
| 7,385,385 B2 | 6/2008 | Magliocco et al. |
| 7,394,660 B2 * | 7/2008 | Hidaka ....................... 361/727 |
| 7,395,133 B2 | 7/2008 | Lowe |
| 7,403,451 B2 | 7/2008 | Goodman et al. |
| 7,427,713 B2 * | 9/2008 | Adducci et al. ............... 174/50 |
| 7,437,212 B2 | 10/2008 | Farchmin et al. |
| 7,447,011 B2 | 11/2008 | Wade et al. |
| 7,457,112 B2 | 11/2008 | Fukuda et al. |
| 7,467,024 B2 | 12/2008 | Flitsch |
| 7,476,362 B2 | 1/2009 | Angros |
| 7,483,269 B1 | 1/2009 | Marvin, Jr. et al. |
| 7,505,264 B2 | 3/2009 | Hall et al. |
| 7,518,858 B2 * | 4/2009 | Takahashi et al. ........ 361/679.33 |
| 7,535,717 B2 * | 5/2009 | Lai et al. ..................... 361/727 |
| 7,542,295 B2 * | 6/2009 | Imsand ....................... 361/726 |
| 7,554,811 B2 | 6/2009 | Scicluna et al. |

(56) References Cited

U.S. PATENT DOCUMENTS

| | | | |
|---|---|---|---|
| 7,568,122 B2 | 7/2009 | Mechalke et al. | |
| 7,570,455 B2 | 8/2009 | Deguchi et al. | |
| 7,573,715 B2 | 8/2009 | Mojaver et al. | |
| 7,583,507 B2* | 9/2009 | Starr et al. | 361/727 |
| 7,584,851 B2 | 9/2009 | Hong et al. | |
| 7,612,996 B2 | 11/2009 | Atkins et al. | |
| 7,625,027 B2 | 12/2009 | Kiaie et al. | |
| 7,630,196 B2 | 12/2009 | Hall et al. | |
| 7,643,289 B2 | 1/2010 | Ye et al. | |
| 7,646,590 B1* | 1/2010 | Corhodzic et al. | 361/641 |
| 7,646,596 B2 | 1/2010 | Ng | |
| 7,667,135 B2* | 2/2010 | Adducci et al. | 174/50 |
| 7,729,107 B2* | 6/2010 | Atkins et al. | 361/679.02 |
| 7,742,308 B1* | 6/2010 | King et al. | 361/727 |
| 7,864,539 B2* | 1/2011 | Dunham et al. | 361/727 |
| 7,912,666 B1* | 3/2011 | Pakzad et al. | 702/115 |
| 7,924,570 B2* | 4/2011 | Randall et al. | 361/724 |
| 8,041,449 B2* | 10/2011 | Noble et al. | 700/213 |
| 8,102,173 B2* | 1/2012 | Merrow | 324/210 |
| 8,140,182 B2* | 3/2012 | Noble et al. | 700/214 |
| 8,160,739 B2* | 4/2012 | Toscano et al. | 700/214 |
| 2001/0006453 A1 | 7/2001 | Glorioso et al. | |
| 2001/0044023 A1 | 11/2001 | Johnson et al. | |
| 2001/0046118 A1 | 11/2001 | Yamanashi et al. | |
| 2001/0048590 A1 | 12/2001 | Behl et al. | |
| 2002/0030981 A1 | 3/2002 | Sullivan et al. | |
| 2002/0044416 A1 | 4/2002 | Harmon, III et al. | |
| 2002/0051338 A1 | 5/2002 | Jiang et al. | |
| 2002/0071248 A1 | 6/2002 | Huang et al. | |
| 2002/0079422 A1 | 6/2002 | Jiang | |
| 2002/0090320 A1 | 7/2002 | Burow et al. | |
| 2002/0109972 A1* | 8/2002 | Mallette | 361/727 |
| 2002/0116087 A1 | 8/2002 | Brown | |
| 2002/0161971 A1 | 10/2002 | Dimitri et al. | |
| 2002/0172004 A1 | 11/2002 | Ives et al. | |
| 2003/0009700 A1* | 1/2003 | Emberty et al. | 713/300 |
| 2003/0035271 A1 | 2/2003 | Lelong et al. | |
| 2003/0043550 A1 | 3/2003 | Ives | |
| 2003/0206397 A1 | 11/2003 | Allgeyer et al. | |
| 2004/0165489 A1* | 8/2004 | Goodman et al. | 369/30.42 |
| 2004/0230399 A1 | 11/2004 | Shin | |
| 2004/0236465 A1 | 11/2004 | Butka et al. | |
| 2004/0264121 A1 | 12/2004 | Orriss et al. | |
| 2005/0004703 A1 | 1/2005 | Christie | |
| 2005/0010836 A1 | 1/2005 | Bae et al. | |
| 2005/0018397 A1 | 1/2005 | Kay et al. | |
| 2005/0055601 A1 | 3/2005 | Wilson et al. | |
| 2005/0057849 A1 | 3/2005 | Twogood et al. | |
| 2005/0069400 A1 | 3/2005 | Dickey et al. | |
| 2005/0083795 A1* | 4/2005 | Doi et al. | 369/30.27 |
| 2005/0109131 A1 | 5/2005 | Wanek et al. | |
| 2005/0116702 A1 | 6/2005 | Wanek et al. | |
| 2005/0131578 A1 | 6/2005 | Weaver | |
| 2005/0179457 A1 | 8/2005 | Min et al. | |
| 2005/0207059 A1 | 9/2005 | Cochrane | |
| 2005/0219809 A1* | 10/2005 | Muncaster et al. | 361/685 |
| 2005/0225338 A1 | 10/2005 | Sands et al. | |
| 2005/0270737 A1 | 12/2005 | Wilson et al. | |
| 2006/0023331 A1 | 2/2006 | Flechsig et al. | |
| 2006/0028802 A1* | 2/2006 | Shaw et al. | 361/728 |
| 2006/0066974 A1 | 3/2006 | Akamatsu et al. | |
| 2006/0130316 A1 | 6/2006 | Takase et al. | |
| 2006/0190205 A1 | 8/2006 | Klein et al. | |
| 2006/0227517 A1 | 10/2006 | Zayas et al. | |
| 2006/0250766 A1 | 11/2006 | Blaalid et al. | |
| 2006/0269384 A1* | 11/2006 | Kiaie et al. | 414/222.02 |
| 2007/0034368 A1 | 2/2007 | Atkins et al. | |
| 2007/0035874 A1 | 2/2007 | Wendel et al. | |
| 2007/0035875 A1 | 2/2007 | Hall et al. | |
| 2007/0053154 A1 | 3/2007 | Fukuda et al. | |
| 2007/0082907 A1 | 4/2007 | Canada et al. | |
| 2007/0127202 A1 | 6/2007 | Scicluna et al. | |
| 2007/0127206 A1 | 6/2007 | Wade et al. | |
| 2007/0195497 A1 | 8/2007 | Atkins | |
| 2007/0248142 A1 | 10/2007 | Rountree et al. | |
| 2007/0253157 A1 | 11/2007 | Atkins et al. | |
| 2007/0286045 A1 | 12/2007 | Onagi et al. | |
| 2008/0007865 A1 | 1/2008 | Orriss et al. | |
| 2008/0030945 A1 | 2/2008 | Mojaver et al. | |
| 2008/0074849 A1* | 3/2008 | Adducci et al. | 361/724 |
| 2008/0080146 A1* | 4/2008 | King et al. | 361/724 |
| 2008/0106870 A1* | 5/2008 | Dully | 361/724 |
| 2008/0112075 A1 | 5/2008 | Farquhar et al. | |
| 2008/0212290 A1* | 9/2008 | Basham et al. | 361/727 |
| 2008/0239564 A1 | 10/2008 | Farquhar et al. | |
| 2008/0282275 A1 | 11/2008 | Zaczek et al. | |
| 2008/0282278 A1 | 11/2008 | Barkley | |
| 2009/0028669 A1 | 1/2009 | Rebstock | |
| 2009/0082907 A1 | 3/2009 | Stuvel et al. | |
| 2009/0086441 A1* | 4/2009 | Randall et al. | 361/724 |
| 2009/0122443 A1 | 5/2009 | Farquhar et al. | |
| 2009/0142169 A1 | 6/2009 | Garcia et al. | |
| 2009/0153992 A1* | 6/2009 | Garcia et al. | 360/31 |
| 2009/0153993 A1* | 6/2009 | Garcia et al. | 360/31 |
| 2009/0153994 A1 | 6/2009 | Merrow | |
| 2009/0175705 A1 | 7/2009 | Nakao et al. | |
| 2009/0237877 A1* | 9/2009 | Honda et al. | 361/679.39 |
| 2009/0261047 A1 | 10/2009 | Merrow | |
| 2009/0261228 A1 | 10/2009 | Merrow | |
| 2009/0261229 A1 | 10/2009 | Merrow | |
| 2009/0262444 A1 | 10/2009 | Polyakov et al. | |
| 2009/0262445 A1 | 10/2009 | Noble et al. | |
| 2009/0262454 A1* | 10/2009 | Merrow | 360/97.02 |
| 2009/0262455 A1 | 10/2009 | Merrow | |
| 2009/0265032 A1* | 10/2009 | Toscano et al. | 700/218 |
| 2009/0265043 A1* | 10/2009 | Merrow et al. | 700/299 |
| 2009/0265136 A1 | 10/2009 | Garcia et al. | |
| 2009/0297328 A1 | 12/2009 | Slocum, III | |
| 2010/0165498 A1* | 7/2010 | Merrow et al. | 360/31 |
| 2010/0172172 A1* | 7/2010 | Noble et al. | 414/222.01 |
| 2010/0268370 A1* | 10/2010 | Nishiuchi et al. | 700/112 |
| 2012/0102374 A1* | 4/2012 | Garcia et al. | 714/718 |

FOREIGN PATENT DOCUMENTS

| | | |
|---|---|---|
| CN | 2341188 | 9/1999 |
| CN | 1114109 | 7/2003 |
| CN | 1192544 | 3/2005 |
| DE | 3786944 | 11/1993 |
| DE | 69111634 | 5/1996 |
| DE | 69400145 | 10/1996 |
| DE | 19701548 | 8/1997 |
| DE | 19804813 | 9/1998 |
| DE | 69614460 | 6/2002 |
| DE | 69626584 | 12/2003 |
| DE | 19861388 | 8/2007 |
| EP | 0210497 | 7/1986 |
| EP | 0242970 | 10/1987 |
| EP | 0 277 634 A | 8/1988 |
| EP | 0356977 | 8/1989 |
| EP | 0442642 | 2/1991 |
| EP | 0466073 | 7/1991 |
| EP | 0776009 | 11/1991 |
| EP | 0582017 | 2/1994 |
| EP | 0617570 | 9/1994 |
| EP | 0635836 | 1/1995 |
| EP | 741508 | 11/1996 |
| EP | 0757320 | 2/1997 |
| EP | 0757351 | 2/1997 |
| EP | 0840476 | 5/1998 |
| EP | 1 045 301 A | 10/2000 |
| EP | 1209557 | 5/2002 |
| EP | 1422713 | 5/2004 |
| EP | 1234308 | 5/2006 |
| EP | 1760722 | 3/2007 |
| EP | 1612798 | 11/2007 |
| GB | 2241118 | 8/1991 |
| GB | 2276275 | 9/1994 |
| GB | 2299436 | 10/1996 |
| GB | 2312984 | 11/1997 |
| GB | 2328782 | 3/1999 |
| GB | 2439844 | 7/2008 |
| JP | 61-115279 | 6/1986 |
| JP | 62-177621 | 8/1987 |

(56) References Cited

FOREIGN PATENT DOCUMENTS

| | | |
|---|---|---|
| JP | 62-239394 | 10/1987 |
| JP | 62-251915 | 11/1987 |
| JP | 63-002160 | 1/1988 |
| JP | 63-004483 | 1/1988 |
| JP | 63-016482 | 1/1988 |
| JP | 63-062057 | 3/1988 |
| JP | 63-201946 | 8/1988 |
| JP | 63-214972 | 9/1988 |
| JP | 63-269376 | 11/1988 |
| JP | 63-195697 | 12/1988 |
| JP | 64-089034 | 4/1989 |
| JP | 2-091565 | 3/1990 |
| JP | 2-098197 | 4/1990 |
| JP | 2-185784 | 7/1990 |
| JP | 2-199690 | 8/1990 |
| JP | 2-278375 | 11/1990 |
| JP | 2-297770 | 12/1990 |
| JP | 3-008086 | 1/1991 |
| JP | 3-078160 | 4/1991 |
| JP | 3-105704 | 5/1991 |
| JP | 3-207947 | 9/1991 |
| JP | 3-210662 | 9/1991 |
| JP | 3-212859 | 9/1991 |
| JP | 3-214490 | 9/1991 |
| JP | 3-240821 | 10/1991 |
| JP | 3-295071 | 12/1991 |
| JP | 4-017134 | 1/1992 |
| JP | 4-143989 | 5/1992 |
| JP | 4-172658 | 6/1992 |
| JP | 4-214288 | 8/1992 |
| JP | 4-247385 | 9/1992 |
| JP | 4-259956 | 9/1992 |
| JP | 4-307440 | 10/1992 |
| JP | 4-325923 | 11/1992 |
| JP | 5-035053 | 2/1993 |
| JP | 5-035415 | 2/1993 |
| JP | 5-066896 | 3/1993 |
| JP | 5-068257 | 3/1993 |
| JP | 5-073566 | 3/1993 |
| JP | 5-073803 | 3/1993 |
| JP | 5-101603 | 4/1993 |
| JP | 5-173718 | 7/1993 |
| JP | 5-189163 | 7/1993 |
| JP | 5-204725 | 8/1993 |
| JP | 5-223551 | 8/1993 |
| JP | 6-004220 | 1/1994 |
| JP | 6-004981 | 1/1994 |
| JP | 6-162645 | 6/1994 |
| JP | 6-181561 | 6/1994 |
| JP | 6-215515 | 8/1994 |
| JP | 6-274943 | 9/1994 |
| JP | 6-314173 | 11/1994 |
| JP | 7-007321 | 1/1995 |
| JP | 7-029364 | 1/1995 |
| JP | 7-037376 | 2/1995 |
| JP | 7-056654 | 3/1995 |
| JP | 7-111078 | 4/1995 |
| JP | 7-115497 | 5/1995 |
| JP | 7-201082 | 8/1995 |
| JP | 7-226023 | 8/1995 |
| JP | 7-230669 | 8/1995 |
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2007-87498 | 4/2007 |
| JP | 2007-188615 | 7/2007 |
| JP | 2007-220184 | 8/2007 |
| JP | 2007-293936 | 11/2007 |
| JP | 2007-305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| TW | 387574 | 4/2000 |
| WO | WO 89/01682 | 8/1988 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |

(56) References Cited

FOREIGN PATENT DOCUMENTS

| WO | WO 2006/100441 | 9/2006 |
|----|----------------|--------|
| WO | WO 2006/100445 | 9/2006 |
| WO | WO 2007/031729 | 3/2007 |

OTHER PUBLICATIONS

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.
Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.
Anderson et al., "Clinical chemistry: concepts and applications", The McGraw-Hill Companies, Inc., pp. 131-132, 2003.
Anderson et al., "High Reliability Variable Load Time Controllable Vibration Free Thermal Processing Environment", Delphion, hhtps://www.delphion.com/tdbs/tdb?order=93A+63418, 3 pages, Mar. 18, 2009.
Asbrand, "Engineers at One Company Share the Pride and the Profits of Successful Product Design", Professional Issues, 4 pages, 1987.
Bair et al., "Measurements of Asperity Temperatures of a Read/Write Head Slider Bearing in Hard Magnetic Recording Disks", Journal of Tribology 113:547-554, Jul. 1991.
Bakken et al., "Low Cost, Rack Mounted, Direct Access Disk Storage Device", www.ip.com, 4 pages, Mar. 3, 2005.
Biber et al., "Disk Drive Drawer Thermal Management", Advances in Electronic Packaging vol. 1:43-46, 1995.
Christensen, "How Can Great firms Fail? Insights from the hard Disk Drive Industry", Harvard Business School Press, pp. 1-26, 2006.
Chung et al., "Vibration Absorber for Reduction of the In-plane Vibration in an Optical Disk Drive", IEEE Transactions on Consumer Electronics, Vo. 48, May 2004.
Curtis et al., "InPhase Professional Archive Drive Architecture" Dec. 17, 2007 http://www.science.edu/TechoftheYear/Nominees/InPhase/Holographic%20Storage.pdf.
Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.
FlexStar Technology, 30E/Cascade Users Manual, Doc #98-36387-00 Rev. 1.8, pp. 1-33, Jun. 1, 2004.
FlexStar Technology, "A World of Storage Testing Solutions," http://www.flexstar.com, 1 page (1999).
FlexStar Technology, "Environment Chamber Products," http://www.flexstar.com, 1 page (1999).
FlexStar Technology, "FlexStar's Family of Products," http://www.flexstar.com, 1 page (1999).
Frankovich, "The Basics of Vibration Isolation Using Elastomeric Materials", EARSC, 2005 http://www.isoloss.com/pdfs/engineering/BasicsofVibrationIsolation.pdf.
Grochowski et al., "Future Trends in Hard Disk Drives" IEEE Transactions on Magnetics, vol. 32, No. 3, pp. 1850-1854, May 1996 http://svn.tribler.org/abc/branches/leo/dataset/preferences/johan/johan-68.pdf.
Gurumurthi et al., "Disk Drive Roadmap from the Thermal Perspective: A Case for Dynamic Thermal Management", International Symposium on Computer Architecture, Proceedings of the $32^{nd}$ Annual International Symposium on Computer Architecture, IEEE Computer Society, pp. 38-49, 2005 http://portal.acm.org/citation.cfm?id=1069807.1069975.
Gurumurthi, "The Need for temperature-Aware Storage Systems", The Tenth Intersociety conference on Thermal and Thermomechanical Phenomena in Electronics, ITHERM pp. 387-394, 2006.
Gurumurthi et al., "Thermal Issues in Disk Drive Design: Challenges and Possible Solutions", ACM Transactions on Storage 2:41-73, Feb. 2006.
Haddad et al., "A new Mounting Adapter for Computer Peripherals with Improved Reliability, Thermal Distribution, Low Noise and Vibration Reduction", ISPS, Advances in Information Storage and Processing Systems, 1:97-108, 1995.
Henderson, "HAD High Aerial Densities Require Solid Test Fixtures", Flexstar Technology, Feb. 26, 2007.
HighBeam Research website "ACT debuts six-zone catalytic gas heater. (American Catalytic Technologies offers new heaters)" www.highbeam.com, 4 pages, 1998.
HighBeam Research website "Asynchronous Testing Increases Throughput." www.highbeam.com, 7 pages, 2000.
HighBeam Research website "Credence announces Production Release of the EPRO AQ Series for Integrated Test and Back-end Processing." www.highbeam.com, 4 pages, 1995.
HighBeam Research website "Test Multiple Parts At Once for Air Leaks. (Brief Article)", www.highbeam.com, 1 page, 1999.
Iwamiya, "Hard Drive Cooling Using a Thermoelectric Cooler", EEP-vol. 19-2, Advances in Electronic Packaging, vol. 2:2203-2208, ASME 1997.
Johnson et al., "Performance Measurements of Tertiary Storage Devices", Proceedings of the $24^{th}$ VLDB Conference, New York, pp. 50-61, 1998.
Ku, "Investigation of Hydrodynamic Bearing Friction in Data Storage information System Spindle Motors", ISPSvo1. 1, Advances in Information Storage and Processing Systems, pp. 159-165, ASME 1995.
Lindner, "Disk drive mounting", IBM Technical Disclosure Brochure, vol. 16, No. 3, pp. 903-904, Aug. 1973.
McAuley, "Recursive Time Trapping for Synchronization of Product and CHAMBER Profiles for Stress Test", Delphion, www.delphion.com/tdbs/tdb?order=88A+60957, 3 pages, Mar. 18, 2009.
Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.
Morris, "Zero Cost Power and Cooling Monitor System", www.delphion.com/tdbs/tdb?order=94A+61950, 3 pages, Jan. 15, 2008.
Nagarajan, "Survey of Cleaning and cleanliness Measurement in Disk Drive Manufacture", North Carolina Department of Environment and Natural Resources, Feb. 1997.
Notification of Transmittal of The International Search Report and the Written Opinion of the International Searching Authority, or the Declaration, PCT/US2008/086181, 15 pages, Mar. 16, 2009.
Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.
Prater et al., "Thermal and Heat-Flow Aspects of Actuators for Hard Disk Drives", InterSociety Conference on Thermal Phenomena, pp. 261-268, 1994.
Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.
Seagate Product Marketing, "Seagate's Advanced Multidrive System (SAMS) Rotational Vibration Feature", Publication TP-229D, Feb. 2000.
Schroeder et al., "Disk Failures in the Real World: What does an MTTP of 1,000,000 hours mean to you?", in FAST'07: $5^{th}$ USENIX Conference on File and Storage Technologies, San Jose, CA, Feb. 14-16, 2007.
Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.
Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.
Tzeng, "Dynamic Torque Characteriestics of Disk-Drive Spindle Bearings", ISPS-vol. 1, Advances in Information Storage and Processing Systems, pp. 57-63, ASME 1995.

(56) References Cited

OTHER PUBLICATIONS

Tzeng, "Measurements of Transient Thermal Strains in a Disk-Drive Actuator", InterSociety conference on Thermal Phenomena, pp. 269-274, 1994.
Wilson-7000 disk Drive Analyzer Product Literature, date accessed Jan. 28, 2009, 2 pages.
Winchester, "Automation Specialists Use Machine Vision as a System Development Tool", IEE Computing & Control Engineering, Jun./Jul. 2003.
Xyratex website "Storage Infrastructure" www.xyratex.com/Products/storage-infrastructure/default.aspx 1995-2008.
Xyratex website "Production Test Systems" www.xyratex.com/Products/production-test-systems/default.aspx 1995-2008.
Xyratex website "Single cell—Production Test Systems" www.xyratex.com/products/production-test-systems/single-cell.aspx 1995-2008.
Xyratex website "Continuous Innovation—Production Test Systems" www.xyratex.com/products/production-test-systems/continuous-innovation.aspx 1995-2008.
Xyratex website "Key Advantages—Production Test Systems" www.xyratex.com/products/production-test-systems/advantages.aspx 1995-2008.
Xyratex website "Testing Drives Colder—Production Test Systems" www.xyratex.com/products/productino-test-systems/colder.aspx 1995-2008.
"Xyratex to Debut its New Automated Test Solution for 2.5-Inch Disk Drives at DISKCON USA 2004" 2004 PR Newswire Europe www.prnewswire.co.uk/cgi/news/release?id=130103.
"Automated Production Test Solutions", Xyratex Product Test brochure, 2006.
Xyratex "Process Challenges in the Hard Drive Industry" slide presentation, 2006 Asian Diskcon.
Suwa et al., "Evaluation System for Residual Vibration from HDD Mounting Mechanism" IEEE Transactions on Magnetics, vol. 35, No. 2, pp. 868-873, Mar. 1999.
Suwa et al., "Rotational Vibration Suppressor" IBM Technical Disclosure Bulletin Oct. 1991.
Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.
Annex to Form PCT/ASA/206 Communication Relating to the Results of the Partial International Search, for International Application No. PCT/US2008/086814, dated Apr. 3, 2009, 5 pages.
Annex to Form PCT/ASA/206 Communication Relating to the Results of the Partial International Search, for International Application No. PCT/US2008/086809, dated Apr. 3, 2009, 1 page.
Notification of Transmittal of the International Search Report and the Written Opinion of the International Searching Authority, or the Declaration, for International Application No. PCT/US2009/039926, Sep. 1, 2009, 13 pages.
Notification of Transmittal of the International Search Report and the Written Opinion of the International Searching Authority, or the Declaration, for International Application No. PCT/US2009/039591, Aug. 31, 2009, 10 pages.
Notification of Transmittal of the International Search Report and the Written Opinion of the International Searching Authority, or the Declaration, for International Application No. PCT/US2008/086814, Sep. 18, 2009, 17 pages.
Notification of Transmittal of the International Search Report and the Written Opinion of the International Searching Authority, or the Declaration, for International Application No. PCT/US2009/039888, Sep. 28, 2009, 13 pages.
Notification of Transmittal of the International Search Report and the Written Opinion of the International Searching Authority, or the Declaration, for International Application No. PCT/US2009/039921, Sep. 25, 2009, 14 pages.
Notification of Transmittal of the International Search Report and the Written Opinion of the International Searching Authority, or the Declaration, for International Application No. PCT/US2009/040058, Sep. 29, 2009, 13 pages.
Notification of Transmittal of the International Search Report and the Written Opinion of the International Searching Authority, or the Declaration, for International Application No. PCT/US2009/040829, Oct. 28, 2009, 13 pages.
Notification of Transmittal of the International Search Report and the Written Opinion of the International Searching Authority, or the Declaration, for International Application No. PCT/US2009/039590, Oct. 30, 2009, 10 pages.
Notification of Transmittal of the International Search Report and the Written Opinion of the International Searching Authority, or the Declaration, for International Application No. PCT/US2009/040835, Oct. 30, 2009, 13 pages.
Notification of Transmittal of the International Search Report and the Written Opinion of the International Searching Authority, or the Declaration, for International Application No. PCT/US2009/040757, Nov. 24, 2009, 12 pages.
Notification of Transmittal of the International Search Report and the Written Opinion of the International Searching Authority, or the Declaration, for International Application No. PCT/US2009/039898, Nov. 24, 2009, 12 pages.
Notification of Transmittal of the International Search Report and the Written Opinion of the International Searching Authority, or the Declaration, for International Application No. PCT/US2009/040795, Nov. 26, 2009, 13 pages.
Notification of Transmittal of the International Search Report and the Written Opinion of the International Searching Authority, or the Declaration, for International Application No. PCT/US2009/045583, Nov. 27, 2009, 13 pages.
Notification of Transmittal of the International Search Report and the Written Opinion of the International Searching Authority, or the Declaration, for International Application No. PCT/US2009/040888, Dec. 29, 2009, 14 pages.
Notification of Transmittal of the International Search Report and the Written Opinion of the International Searching Authority, or the Declaration, for International Application No. PCT/US2009/040894, Dec. 22, 2009, 12 pages.
Notification of Transmittal of the International Search Report and the Written Opinion of the International Searching Authority, or the Declaration, for International Application No. PCT/US2009/039934, Dec. 23, 2009, 12 pages.
Notification of Transmittal of the International Search Report and the Written Opinion of the International Searching Authority, or the Declaration, for International Application No. PCT/US2009/040965, Dec. 23, 2009, 12 pages.
Notification of Transmittal of the International Search Report and the Written Opinion of the International Searching Authority, or the Declaration, for International Application No. PCT/US2009/040973, Jan. 11, 2010, 13 pages.
Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/727,150. The foregoing U.S. patent application is a continuation of U.S. Appl. No. 12/104,536. Revised as of May 27, 2010.
Cardinal Intellectual Property's search report including the results of a search for the features of the claims included in the U.S. patent application entitled "Transferring Storage Devices Within Storage Device Testing Systems", inventors: John P. Toscano et al., and having assigned U.S. Appl. No. 12/727,201. The foregoing U.S. patent application is a continuation of U.S. Appl. No. 12/424,980. Revised as of Jan. 4, 2010.
Cardinal Intellectual Property's search report including the results of a search for the features of the claims included in the U.S. patent application entitled "Processing Storage Devices", inventors: Richard W. Slocum III., and having assigned U.S. Appl. No. 12/727,619. The foregoing U.S. patent application is a continuation of U.S. Appl. No. 12/474,388. Revised as of Jan. 5, 2009.

(56) References Cited

OTHER PUBLICATIONS

Cardinal Intellectual Property's search report including the results of a search for the features of the claims included in the U.S. patent application entitled "Bulk Feeding Disk Drives to Disk Drive Testing Systems", inventors: Noble et al., and having assigned U.S. Appl. No. 12/726,856. The foregoing U.S. patent application is a continuation of U.S. Appl. No. 12/104,869. Revised as of Jan. 15, 2010.

Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069. Revised as of Jan. 13, 2010.

Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700. The foregoing U.S. patent application is a continuation of U.S. Appl. No. 12/503,567. Revised as of Jan. 13, 2010.

Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575. Revised as of Feb. 17, 2010.

Cardinal Intellectual Property's search report including the results of a search for the features of the claims included in the U.S. patent application entitled "Conductive Heating" inventors: Brian S. Merrow et al., and having assigned U.S. Appl. No. 12/760,164. The foregoing U.S. patent application is a continuation of U.S. Appl. No. 12/503,593. Revised as of Jan. 6, 2010.

Cardinal Intellectual Property's search report including the results of a search for the features of the claims included in the U.S. patent application entitled "Storage Device Temperature Sensing", inventors: Brian S. Merrow et al., and having assigned U.S. Appl. No. 12/760,305. The foregoing U.S. patent application is a continuation of U.S. Appl. No. 12/503,687. Revised as of Jan. 7, 2010.

Cardinal Intellectual Property's search report including the results of a search for the features of the claims included in the U.S. patent application entitled "Solid State Temperature Control of Hard Drive Tester", inventors: Brian S. Merrow and having assigned U.S. Appl. No. The foregoing U.S. patent application is a continuation of U.S. Appl. No. 12/105,103. Revised as of Jan. 14, 2010.

Cardinal Intellectual Property's search report including the results of a search for the features of the claims included in the U.S. patent application entitled "Vibration Isolation Within Disk Drive Testing Systems", inventors: Brian S. Merrow and having assigned U.S. Appl. No. 12/767,142. The foregoing U.S. patent application is a continuation of U.S. Appl. No. 12/105,105. Revised as of Jan. 12, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/766,680. The foregoing U.S. patent application is a continuation of U.S. Appl. No. 11/959,133. Revised as of Jan. 14, 2010.

Cardinal Intellectual Property's search report including the results of a search for the features of the claims included in the U.S. patent application entitled "Chilled Water Temp Control of Disk Drive Tester", inventors: Brian S. Merrow and having assigned U.S. Appl. No. 12/766,680. The foregoing U.S. patent application is a continuation of U.S. Appl. No. 12/105,061. Revised as of Feb. 18, 2010.

Cardinal Intellectual Property's search report including the results of a search for the features of the claims included in the U.S. patent application entitled "Vibration Isolation Within Disk Drive Testing Systems," inventors: Brian S. Merrow and having assigned U.S. Appl. No. 12/767,142. The foregoing U.S. patent application is a continuation of U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/767,113. The foregoing U.S. patent application is a continuation of U.S. Appl. No. 11/959,133. Revised as of Apr. 4, 2010.

Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/766,680. The foregoing U.S. patent application is a continuation of U.S. Appl. No. 11/959,133. Revised as of Apr. 1, 2010.

Exhibit 1 in *Xyratex Technology, Ltd v. Teradyne, Inc.*; Newspaper picture that displays the CSO tester; 1990.

Exhibit 2 in *Xyratex Technology, Ltd v. Teradyne, Inc.*; Photos of the CSO tester obtained from Hitachi; 1990.

Exhibit 1326 in *Xyratex Technology, Ltd v. Teradyne, Inc.*; Image of the back of Exhibit 1 and Exhibit 2 photos, which display the photos' dates; 1990.

Exhibit 1314 in *Xyratex Technology, Ltd. v. Teradyne, Inc.*; Case, "Last products of Disk-File Development at Hursley and Millbrook," IBM, Oct. 12, 1990.

Exhibit 1315 in *Xyratex Technology, Ltd. v. Teradyne, Inc.*; Case, "History of Disk-File Development at Hursley and Millbrook," IBM, Oct. 17, 1990.

*Xyratex Technology, Ltd. v. Teradyne, Inc.*, Teradyne, Inc's Prior Art Notice Pursuant to 35 U.S.C. Section 282. Case No. CV 08-04545 SJO (PLAx), Oct. 16, 2009.

*Xyratex Technology, Ltd. v. Teradyne, Inc.*, Amended Joint Trial Exhibit List of Xyratex and Teradyne. Case No. CV 08-04545 SJO (PLAx), Nov. 12, 2009.

Notification of Transmittal of the International Search Report and the Written Opinion of the International Searching Authority, or the Declaration, for International Application No. PCT/GB2005/003490, Jan. 26, 2006, 10 pages.

International Search Report and Written Opinion dated Feb. 9, 2012 issued in international application No. PCT/US2011/043864.

PCT Notification Concerning Transmittal of International Preliminary Report on Patentability, dated Jan. 31, 2013, 8 pages.

\* cited by examiner

BULK TRANSFER OF STORAGE DEVICES USING MANUAL LOADING

TECHNICAL FIELD

This disclosure relates to bulk transfer of storage devices to and from storage device testing systems and transfer stations for storage device testing systems.

BACKGROUND

Storage device manufacturers typically test manufactured storage devices for compliance with a collection of requirements. Test equipment and techniques exist for testing large numbers of storage devices serially or in parallel. Manufacturers tend to test large numbers of storage devices simultaneously. Storage device testing systems typically include one or more racks having multiple test slots that receive storage devices for testing.

Current storage device testing systems use an operator, a robotic arm, or a conveyer belt to individually feed storage devices to a transfer location for loading into the testing system for testing. Other current storage device testers use a tote or a mobile tote to load or unload multiple storage devices to a transfer location at the same time. A robotic arm of the testing system retrieves the storage devices individually or in small batches from the transfer location and loads them in test slots for testing.

SUMMARY

In general, this disclosure relates to the bulk transfer of storage devices using manual loading.

In one aspect, a storage device transfer station is provided for transferring storage devices from a human operator to automated machinery for testing. The storage device transfer station includes a plurality of slots each capable of holding a storage device. The plurality of slots is arranged in at least one field arranged between two parallel planes. Each slot has a first open end and a second open end, such that each open end is accessible for loading and unloading a storage device. The first open ends are accessible at a first plane of the two parallel planes and the second open ends are accessible at a second plane of the two parallel planes.

In another aspect, a storage device testing system is provided for testing storage devices. The storage device testing system includes a storage device transfer station for transferring storage devices from a human operator to automated machinery. The storage device transfer station includes a plurality of slots each capable of holding a storage device. The plurality of slots is arranged in at least one field arranged between two parallel planes. Each slot has a first open end and a second open end, such that each open end is accessible for loading and unloading a storage device. The first open ends are accessible at a first plane of the two parallel planes and the second open ends are accessible at a second plane of the two parallel planes. The storage device testing system also includes automated machinery configured to access the second open end of at least one of the plurality of slots.

According to another aspect, a method of testing storage devices includes manually loading a plurality of storage devices into a plurality of slots of a storage device transfer station; actuating automated machinery to transfer a plurality of the storage devices between the plurality of slots of the storage device transfer station and the plurality of slots of the storage device transfer station; and manually unloading a plurality of storage devices from a plurality of slots of the storage device transfer station.

Embodiments of the disclosed methods, systems and devices may include one or more of the following features. The storage device transfer station can include at least one door covering at least a portion of the first plane. The door can be capable of locking and unlocking, including automatic locking and unlocking. At least one of the slots can have a stop, and the door can include resilient material or another mechanism arranged to push a storage device against the stop when the door is closed. The slots could be arranged to align a storage device in the horizontal or vertical directions.

In some implementations, the storage device transfer station has multiple doors covering the first plane.

In some embodiments, the plurality of slots could be arranged to receive a storage device at the first plane from a human operator, and the plurality of slots could be arranged to provide a storage device at the second plane to automated machinery.

In some configurations, the at least one field has at least 125 slots. In some configurations, the field has one or more vertically stacked rows. The slot could be arranged to prevent contact between a human operator and the automated machinery. In some embodiments, the storage device transfer station could have a door covering a portion of the first plane and configured to signal the automated machinery to restrict its movement while the door is open.

Methods can be carried out such that the automated machinery's movement is restricted while the plurality of storage devices is being manually loaded or unloaded. Methods can be carried out such that the manual loading of a plurality of storage devices into a plurality of slots of a storage device transfer station includes loading the storage devices into a subset of the slots of a storage device transfer station. Methods can include sorting the plurality of storage devices to group storage devices with substantially similar test results together.

Embodiments can include one or more of the following advantages.

Embodiments of the disclosed systems, methods, and devices can help to reduce human operator wait time associated with loading and unloading storage devices into/from a storage device testing system. For example, in some embodiments, a bulk load/unload transfer station can allow a human operator to load/unload many storage devices into a testing system at once, thereby freeing the operator to perform other tasks between load/unload operations.

A bulk load and/or unload system can also afford more opportunity to improve the handling of storage devices. For example, if one human operator loads many storage devices at once, e.g., sequentially during a single loading operation of limited duration, the number of opportunities to introduce storage device presentation errors is reduced as compared to loading storage devices continuously over an extended period of time.

A bulk load and/or unload system can also improve the efficiency of automated machinery, by allowing the automated machinery to load or unload storage devices to/from many transfer station slots, without waiting for a human operator to remove or present a storage device to the automated machinery.

A bulk load and/or unload system can also allow for automated sorting of output storage devices into different fields, queues or containers.

In some embodiments, the disclosed systems, methods, and devices can allow a large number of storage devices to be queued for input and/or output.

Some embodiments do not require the use of any custom containers or totes to carry the storage devices. The cost of registering the storage devices in space and making the storage device presentation compatible with automated machinery is only incurred in the feeding station, and not in every tote.

In some embodiments, the disclosed systems, methods, and devices provide means of achieving many of the benefits of a fully automated factory (e.g., reliability, repeatability, and density) using a manual, yet bulk oriented input/output station.

Bulk feeding of storage devices can help to provide for increased throughput by reducing the amount of human intervention.

Bulk feeding of storage devices can help to provide for increased throughput by limiting the amount of human intervention to discrete and spaced apart intervals of time. This can help to reduce presentation error by reducing the likelihood that an operator will lose attention or focus over time, e.g., as compared to a system in which an operator continuously feeds storage devices into the system (or removes storage devices therefrom) over an extended period of time.

In some embodiments, many storage devices may be accessed at the same time. This makes the load/unload time very fast. In some embodiments, multiple operators could load and unload, further increasing efficiency.

In some embodiments, sorting or binning of storage devices is possible by the use of multiple doors. One door may enclose all passed storage devices while another encloses all failed storage devices. Any number of doors could be used.

Bulk feeding of storage devices in transfer stations is very space-efficient because no internal transport mechanisms are required. The depth of a transfer station can be as little as the depth of a storage device. The lack of transport mechanisms also improves the reliability of a transfer station compared to transfer stations with automated transport mechanisms.

Some embodiments use no moving parts.

Other aspects, features, and advantages are in the description, drawings, and claims.

DESCRIPTION OF DRAWINGS

Like reference symbols in the various drawings indicate like elements.

DETAILED DESCRIPTION

System Overview

A storage device, as used herein, includes disk drives, solid state drives, memory devices, and any device that benefits from asynchronous processes in manufacturing or test. A disk drive is generally a non-volatile storage device that stores digitally encoded data on rapidly rotating platters with magnetic surfaces. A solid-state drive (SSD) is a data storage device that uses solid-state memory to store persistent data. An SSD using SRAM or DRAM (instead of flash memory) is often called a RAM-drive. The term solid-state generally distinguishes solid-state electronics from electromechanical devices.

Figure 1:
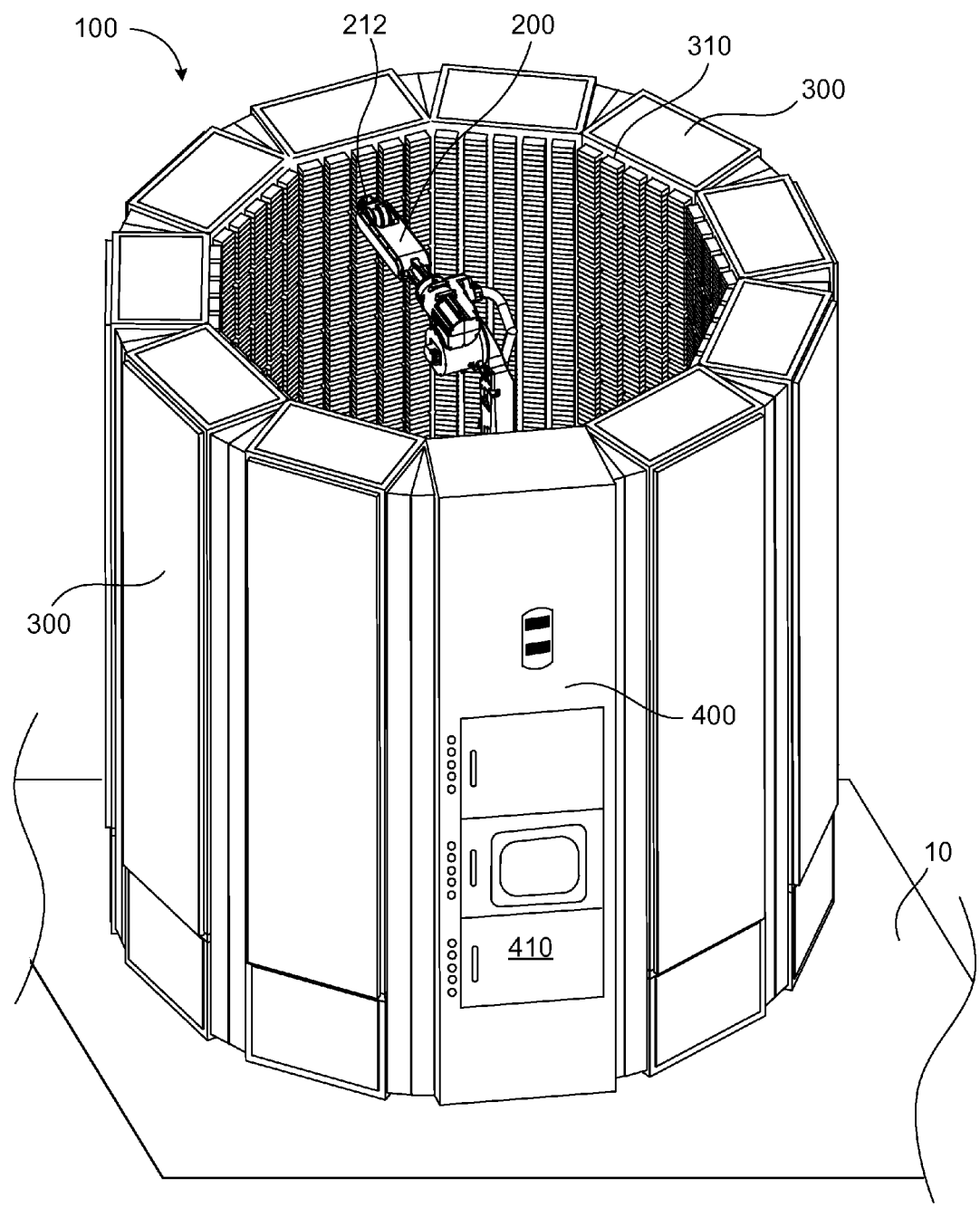
FIG. 1 is a perspective view of a storage device testing system and a transfer station.
Figure 2:
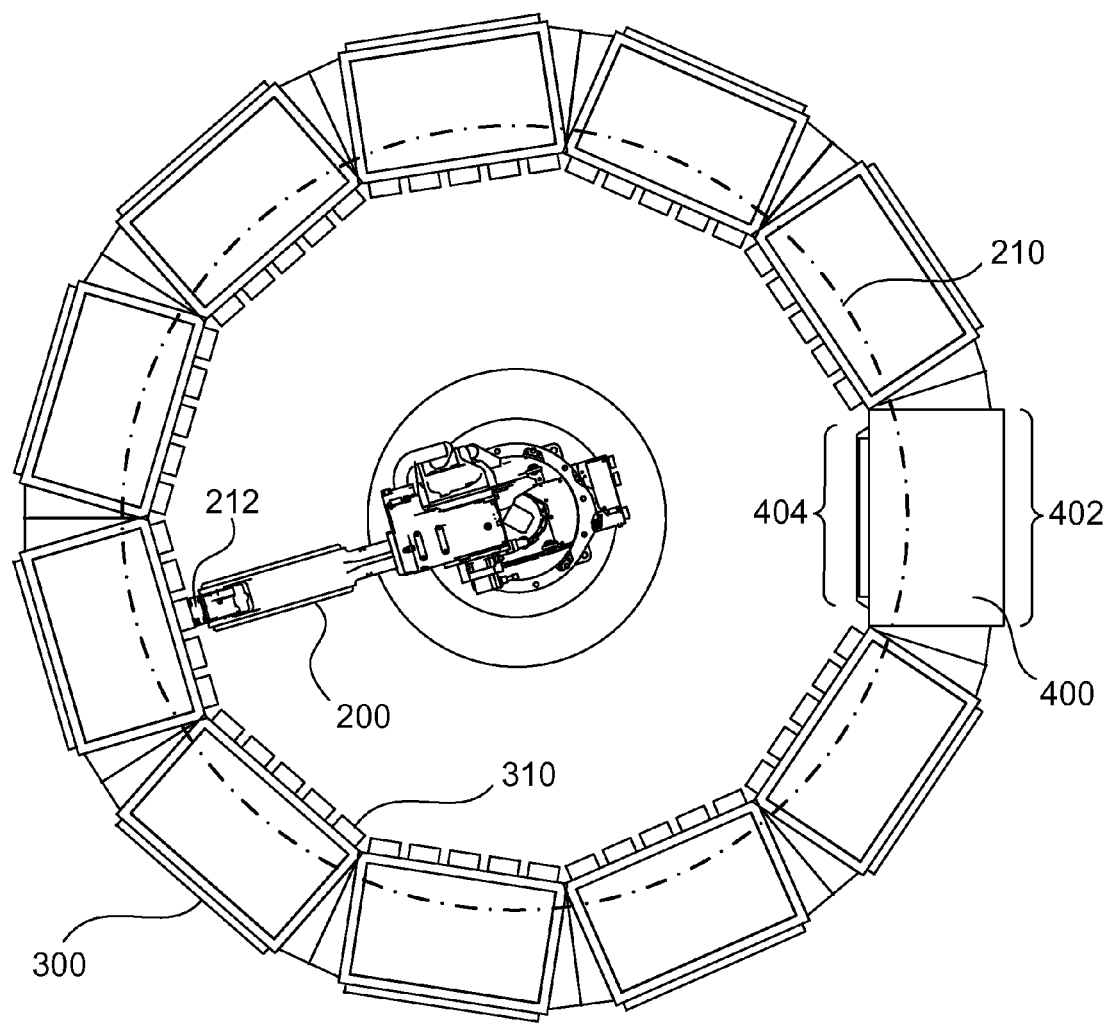
FIG. 2 is a top view of a storage device testing system and a transfer station.
Figure 3:
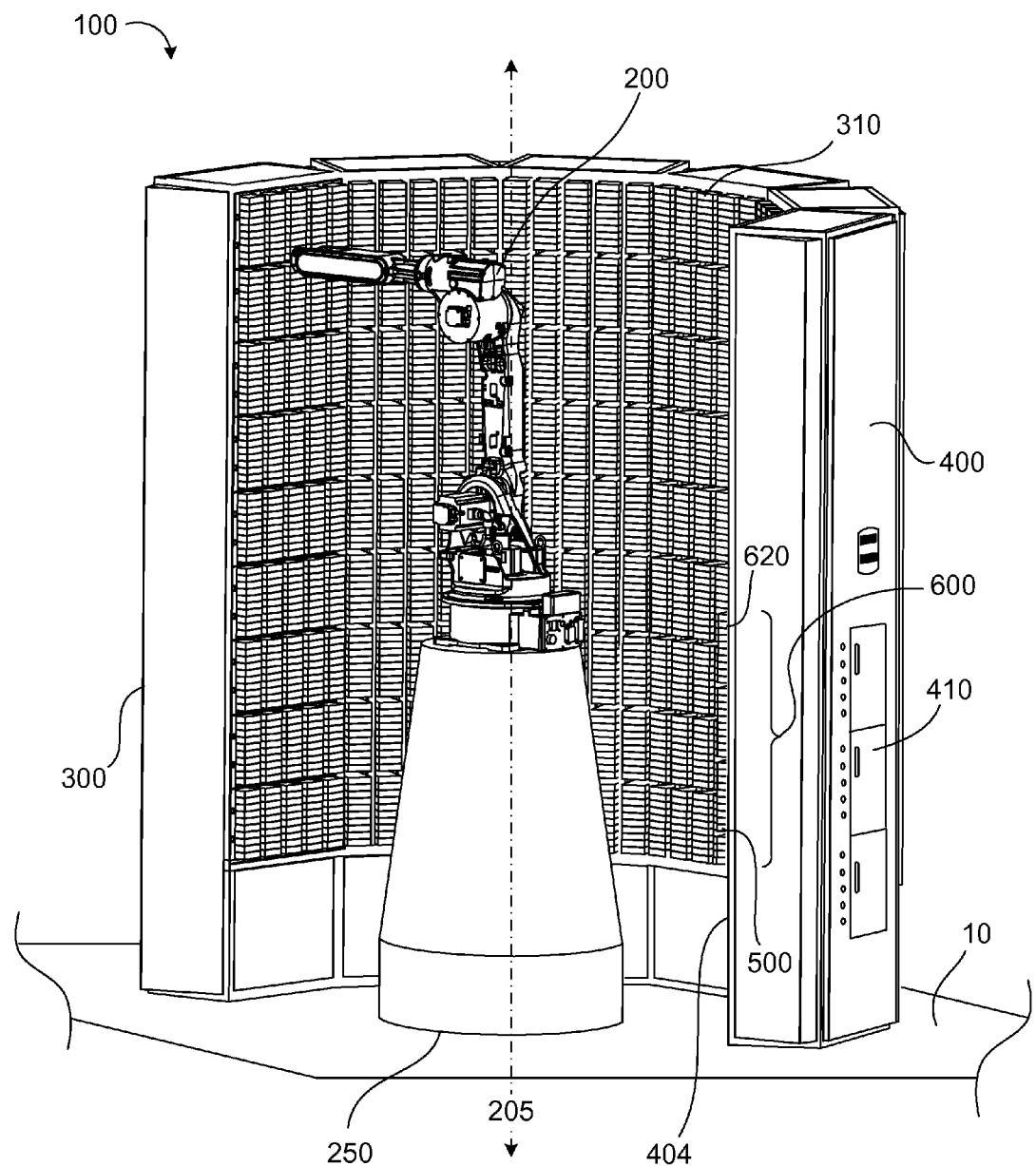
FIG. 3 is a perspective view of a storage device testing system and a transfer station.

Referring to FIGS. 1-3, in some implementations, a storage device testing system 100 includes at least one automated transporter 200 (e.g. robotic arm, gantry system, or multi-axis linear actuator) defining a first axis 205 (see FIG. 3) substantially normal to a floor surface 10. In the examples shown, the automated transporter 200 comprises a robotic arm 200 operable to rotate through a predetermined arc about the first axis 205 and to extend radially from the first axis 205. The robotic arm 200 is operable to rotate 360° about the first axis 205 and includes a manipulator 212 disposed at a distal end of the robotic arm 200 to handle a storage device 500 and/or a storage device transporter 550 carrying the storage device 500 (see e.g. FIGS. 8-10). Multiple racks 300 are arranged around the robotic arm 200 for servicing by the robotic arm 200. Each rack 300 houses multiple test slots 310 configured to receive storage devices 500 for testing. The robotic arm 200 defines a substantially cylindrical working envelope volume 210, with the racks 300 being arranged within the working envelope 210 for accessibility of each test slot 310 for servicing by the robotic arm 200. The substantially cylindrical working envelope volume 210 provides a compact footprint and is generally only limited in capacity by height constraints. In some examples, the robotic arm 200 is elevated by and supported on a pedestal or lift 250 (see FIG. 3) on the floor surface 10. The pedestal or lift 250 increases the size of the working envelope volume 210 by allowing the robotic arm 200 to reach not only upwardly, but also downwardly to service test slots 310. The size of the working envelope volume 210 can be further increased by adding a vertical actuator to the pedestal or lift 250.

The automated transporter 200 is configured to independently service each test slot 310 to provide a continuous flow of storage devices 500 through the testing system 100. A continuous flow of individual storage devices 500 through the testing system 100 allows varying start and stop times for each storage device 500, whereas other systems that require batches of storage devices 500 to be run all at once must all have the same start and end times. Therefore, with continuous flow, storage devices 500 of different capacities can be run at the same time and serviced (loaded/unloaded) as needed.

Referring to FIG. 3, the storage device testing system 100 includes a transfer station 400 configured for bulk feeding of storage devices 500 to the automated transporter 200. The automated transporter 200 independently services each test slot 310 by transferring a storage device 500 between the transfer station 400 and the test slot 310. The transfer station 400 has one or more access ports 410 each allowing an operator to load and unload multiple storage devices 500 presented for servicing by the automated transporter 200. The transfer station 400 is a service point for delivering and retrieving storage devices 500 to and from the storage device testing system 100. Each access port 410 allows an operator to deliver and retrieve a portion or all of a collection 600 of storage devices 500 to and from the transfer station 400. Storage devices 500 are accessible by an operator at an outer plane 402 (FIG. 2) of the transfer station 400 and accessible by an automated transporter 200 at an inner plane 404 (FIG. 2) of the transfer station 400. The outer plane 402 and inner plane 404 are substantially parallel to each other. Each collection 600 includes individual storage device receptacles 620 or slots into which the storage devices 500 are loaded and out of which the storage devices 500 are unloaded. Some implementations of the storage device receptacles are configured to receive storage device transporters 550 (see FIGS. 8-10) each containing storage devices 500.

In some implementations, a collection 600 may take the form of one or more vertically stacked rows of storage device receptacles 620. The number of storage device receptacles 620, and corresponding storage devices 500, could be as few as one or as many as 125 (e.g. 25 vertically stacked rows of 5) or more. In the example where the number of drives in the collection 600 is 125, an operator could load or unload the entire collection of drives in about ten minutes.

In some examples, an operator manually loads a plurality of storage devices 500 into the collection 600 in the transfer station 400. The robotic arm 200 may continuously unload the storage devices 500 and place them into test slots 310 for testing, and may also continuously transfer tested storage devices 500 from test slots 310 to storage device transfer station receptacles 620. During this time, the operator can leave and engage in other tasks, e.g., loading and unloading other storage devices 500 in a different transfer station 400 or testing system 100. Once a quantity of storage devices 500 have been tested and placed back into the transfer station 400, the operator can return to the transfer station 400 and unload the storage devices 500.

In the example shown in FIG. 3, each collection 600 is accessible from the inner plane 404 of the transfer station 400 in a presentation position and may be designated as a source collection 600 of storage devices 500 for testing or as a destination collection 600 of tested storage devices 500 (or both or some combination thereof). Destination collections 600 may be classified as "passed return collections" or "failed return collections" for receiving respective storage devices 500 that have either passed or failed a functionality test, respectively. Alternatively, in some implementations, a single collection 600 may contain storage devices 500 of multiple statuses and could be sorted according to status. For example, all of the storage devices 500 placed by the robotic arm 200 at one access port 410 associated with the collection 600 may all be drives that have passed the functionality test (or otherwise had substantially similar test results), while all of the storage devices 500 placed by the robotic arm 200 at another access port 410 associated with the collection 600 may all be drives that have failed the functionality test. In use, the storage devices 500 may be loaded by the robotic arm 200 into the storage device receptacles 620 of the collection 600 in a different order and arrangement than they were unloaded. Similarly, a storage device 500 unloaded by the robotic arm 200 from one collection 600 prior to testing may be loaded into a different collection 600 after testing. In some examples, a storage device 500 unloaded from one transfer station 400 prior to testing is loaded into another transfer station 400 after testing.

Figure 4A:
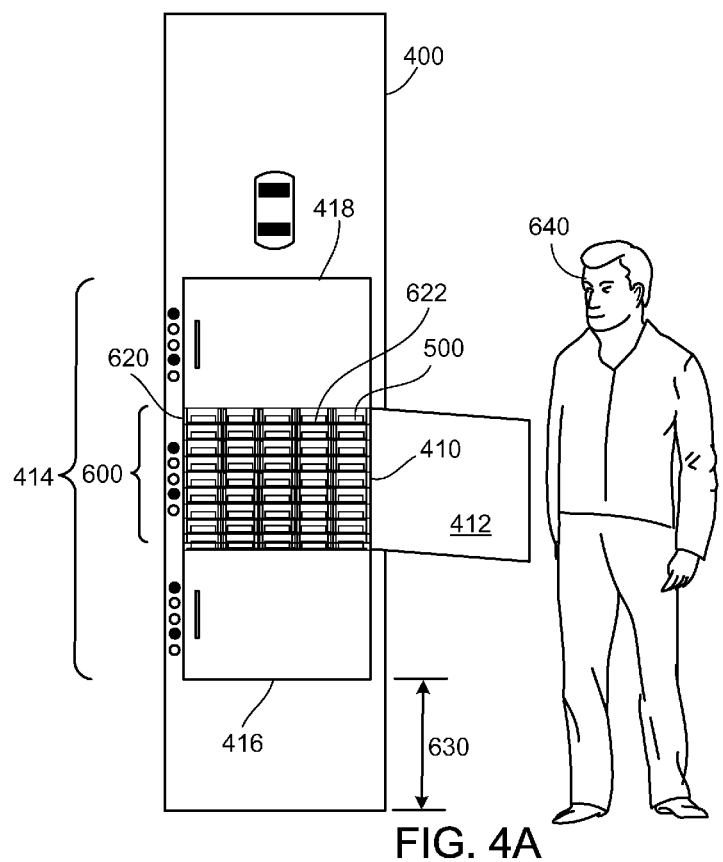
FIGS. 4A and 4B are side views of a transfer station of a storage device testing system.

FIG. 4A shows a view of the outer plane 402 of the transfer station 400. A collection 600 of storage devices 500 is accessible at one or more access ports 410. In some implementations, each access port 410 may provide access to the entire collection 600 or a subset or portion of the collection. The collection 600 of storage devices 500 can be arranged so that an open end 624 of each storage device receptacle 620 accessible at the access port 410 is accessible for loading and unloading a storage device 500.

In some implementations, multiple access ports 410 are available in proximity to each other. For example, multiple access ports 410 can be arranged in a vertical column 414, as shown, or arranged in a different configuration, such as a horizontal row, a combination of rows or columns, or another configuration of access ports 410. In implementations where an access port 410 provides access to a portion of a collection 600, the combination of multiple access ports 410 may provide access to the entire collection 600.

In some implementations, the access ports 410 are arranged to be accessible to a human operator 640. The human operator can load and unload storage devices 500 directly into the storage device receptacles 620 of the collection 600 of storage devices. The access ports 410 can be arranged to be suitable for human use, for example, arranged to account for ergonomic factors. For example, the access ports 410 can be arranged within the field of reach of a human operator 640. For example, the in the exemplary configuration of a vertical column 414 of access ports 410, the lower edge 416 of the lowest access port could be a height 630 of about 50 centimeters off of the ground. The upper edge 418 of the highest access port could be a height 632 of about 200 centimeters off of the ground.

In some implementations, more than one human operator 640 can access the same access port 410 simultaneously, for example, to speed up workflow and load or unload more storage devices 500 in a shorter amount of time.

In some implementations, the size and construction of the collection 600 and the storage device receptacles 620 is such that a robotic arm 200 does not come in contact with a human operator 640. For example, the storage device receptacles 620 can be long enough to provide a buffer of space between the portion accessible to the robotic arm 200 and the portion accessible to the human operator 640.

Figure 4B:
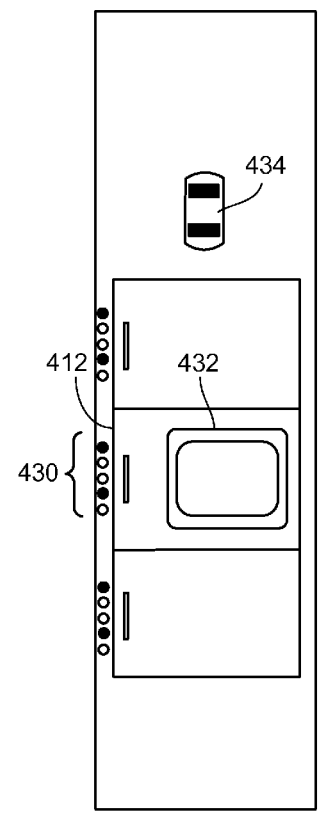

An access port 410 may have an optional door 412 that can be opened and closed by a human operator 640. FIG. 4B shows another view of the outer plane 402 of the transfer station 400 in which the door 412 is closed, blocking the collection 600 of storage devices 500 from access. In some implementations, the door 412 can be used to protect the storage devices 500 within from external factors, such as heat, light, and dust, or to isolate the interior of the storage device testing system 100 from the surrounding environment. For example, the human operator might keep the door 412 closed at all times except when loading or unloading storage devices 500 from the associated access port 410 to protect the drives from those factors.

In some implementations, the status of the door 412 can determine actions of the robotic arm 200. For example, the robotic arm 200 can be configured to refrain from loading or unloading storage devices 500 from the portion of the collection 600 associated with the door 412 when the door is open, indicating that a human operator 640 is in the process of loading or unloading some of the storage devices. Similarly, the robotic arm 200 can be configured to resume loading and unloading storage devices 500 when the door 412 is closed. Alternatively, the robotic arm 200 can be configured to cease all motion while the door 412 is open.

In some implementations, the door 412 can also be locked and unlocked. For example, the locking capability can be used to control access to the collection 600 associated with the door. For example, all doors may be kept locked until such time that the collection 600 associated with a door 412 is ready for service by a human operator. For example, a collection behind a particular door 412 may contain untested storage devices 500. In such a case, the door 412 may be kept locked until all storage devices 500 have been transferred to test slots 310. When all storage devices 500 have been transferred, the door 412 may be automatically unlocked by the system, to allow a human operator 640 to load new untested storage devices 500. In another example, the collection 600 associated with a door 412 may contain tested storage devices 500 that have passed a functionality test. When a human operator 640 requests access to passed storage devices, the system may unlock only that door 412 covering the part of the collection 600 that consists of passed storage devices. This prevents the human operator 640 from inadvertently removing storage devices from some other part of the collection 600.

FIG. 4B also shows status indicators 430 associated with a door 412. The status indicators 430 can provide information to a nearby human operator 640 about the storage devices 500 in the portion of the collection 600 behind the door. For example, the status indicators 430 may indicate that the storage devices 500 behind the door 412 have been tested, or that some or all of the storage devices 500 are still awaiting testing. In another example, the status indicators 430 may indicate which storage device receptacles 620 behind the door 412 contain storage devices 500 and which storage device receptacles 620 behind the door 412 do not contain storage devices 500. Further, in situations where the storage devices 500 have been tested, the status indicators 430 may indicate whether the storage devices 500 have passed the testing and are considered "good output," or that the storage devices 500 have failed the testing and are considered "bad output." In implementations in which the door 412 is capable of locking and unlocking, the status indicators 430 may indicate whether the door 412 is locked or unlocked. In some implementations, the status indicators 430 may be combined with pushbuttons. In these implementations, pushing a button may signal to the system that the human operator is requesting access to the storage devices 500 behind the associated door 412.

The status indicators 430 may take the form of lights (e.g. light-emitting diodes) that light up or flash, for example. In some implementations, the status indicators may be part of an alphanumeric display, for example, a liquid-crystal display.

In some implementations, the door 412 may have a display screen 432 instead of or in addition to the status indicators 430. The display screen 432 may provide additional information or more details than would be relayed by the status indicators 430 (if present). For example, the display screen 432 may allow a human operator 640 to access or modify the configuration of the transfer station 400 or the entire testing system. The display screen 432 may be a touch screen, for example, or may have another type of associated control system such as a keyboard and mouse.

In some implementations, the transfer station 400 has a master status indicator 434 that indicates general information to one or more human operators 640 in the vicinity, for example, whether the transfer station 400 or the storage device testing system 100 have encountered errors requiring human intervention or repair.

Figure 5:
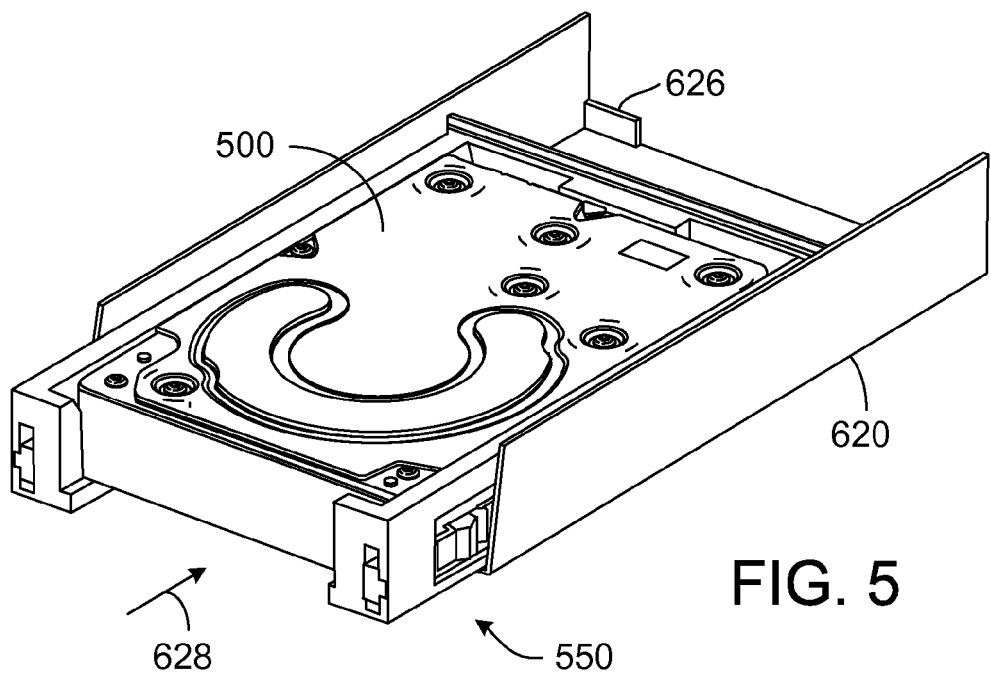
FIG. 5 is a perspective view of a storage device transporter and a storage device receptacle.

FIG. 5 shows an implementation of the storage device receptacle 620 that has an integrated stop 626. The stop 626 prevents a storage device 500 or, in the implementation shown, storage device transporter 550, from being pushed too far into the storage device receptacle 620 when the storage device or transporter is loaded. In some implementations, the door 412 may be made of or may include resilient material that pushes 628 the storage devices 500 in the collection 600 behind the door against the stop in their respective storage device receptacles 620 when the door is closed. In some implementations, the door 412 may include other mechanisms for pushing the storage devices 500 in the collection 600 behind the door against the stop, for example mechanisms that use springs, rigid mechanical members, or dashpots. Also, in some implementations, the stop 626 or another component of the storage device receptacle 620 is constructed to horizontally and vertically align a storage device 500 when the storage device is inserted in the receptacle, for example, in functional cooperation with the pushing mechanism of the door.

In some implementations, the door 412, the storage device receptacle 620, or another element of the testing system 100 may have one or more detectors configured to detect the presence and absence of storage devices 500 within the storage device receptacles 620 of the collection 600. For example, the detector could be integrated with the stop 626, or the detector may be a separate component. The information supplied by the detector may be used by the status indicators 430 or display screen 432 to indicate the presence or absence of the storage devices 500. In some implementations, the robotic arm 200 may incorporate functionality to detect the presence or absence of a storage device 500 within the storage device receptacles 620, for example a camera, bar code scanner, or laser rangefinder.

Figure 6:
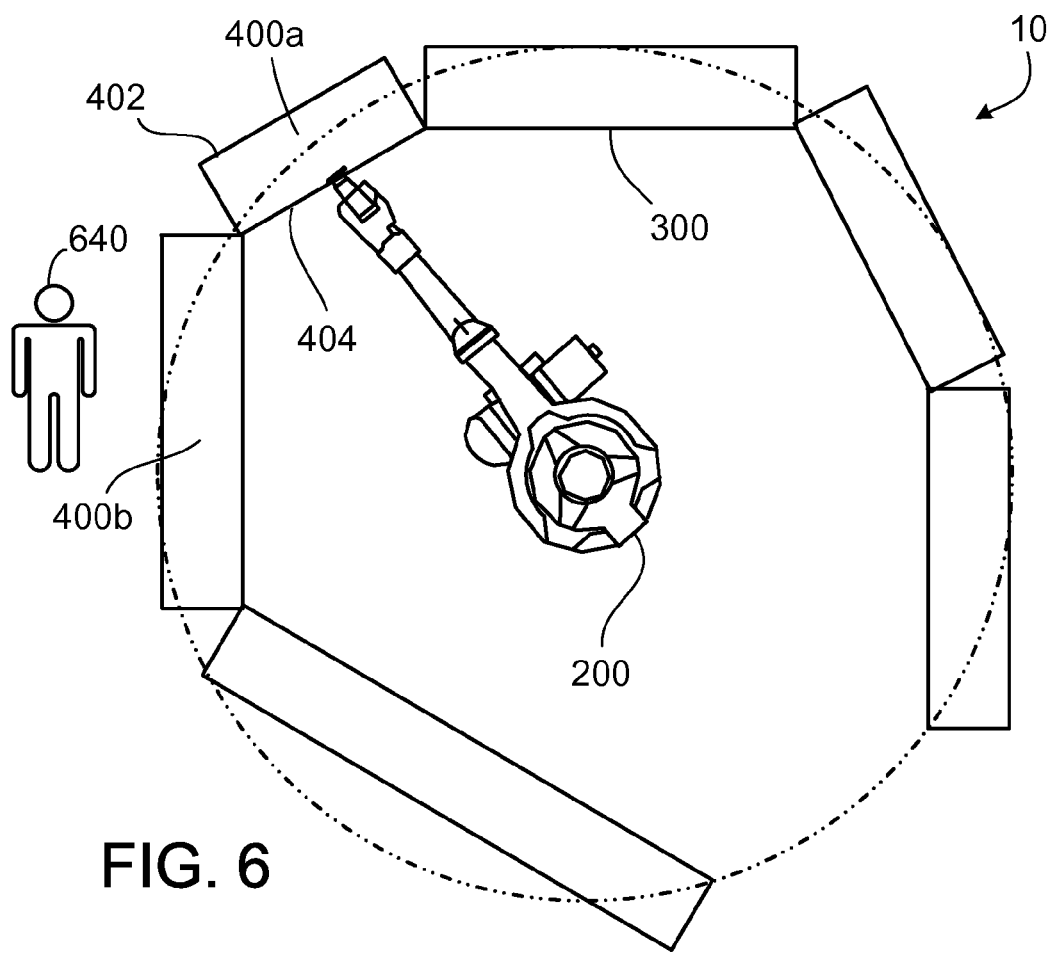
FIG. 6 is a top view of a storage device testing system and transfer stations.

As shown in FIG. 6, in some implementations, a human operator 640 and the robotic arm 200 can perform activities simultaneously. For example, the storage device testing system 100 may have multiple transfer stations 400a, 400b. In one exemplary scenario, the human operator has, using an access port 410 at the outer plane 402, loaded storage devices 500 into one transfer station 400a for testing. The robotic arm 200 now unloads the storage devices, which are also accessible at the inner plane 404, for testing. At the same time as the robotic arm 200 unloads storage devices 500, the human operator 640 can load other storage devices into the other transfer station 400b. In another exemplary scenario, the robotic arm has already loaded tested storage devices 500 into the other transfer station 400b, which the human operator 640 unloads while the robotic arm 200 loads or unloads storage devices 500 in the first transfer station 400a. In other scenarios, the human operator 640 and the robotic arm 200 each load or unload drives from different collections 600 in the same transfer station 400, or different portions of the same collection 600. Other scenarios in which the human operator 640 and the robotic arm 200 operate simultaneously are possible.

Figure 7:
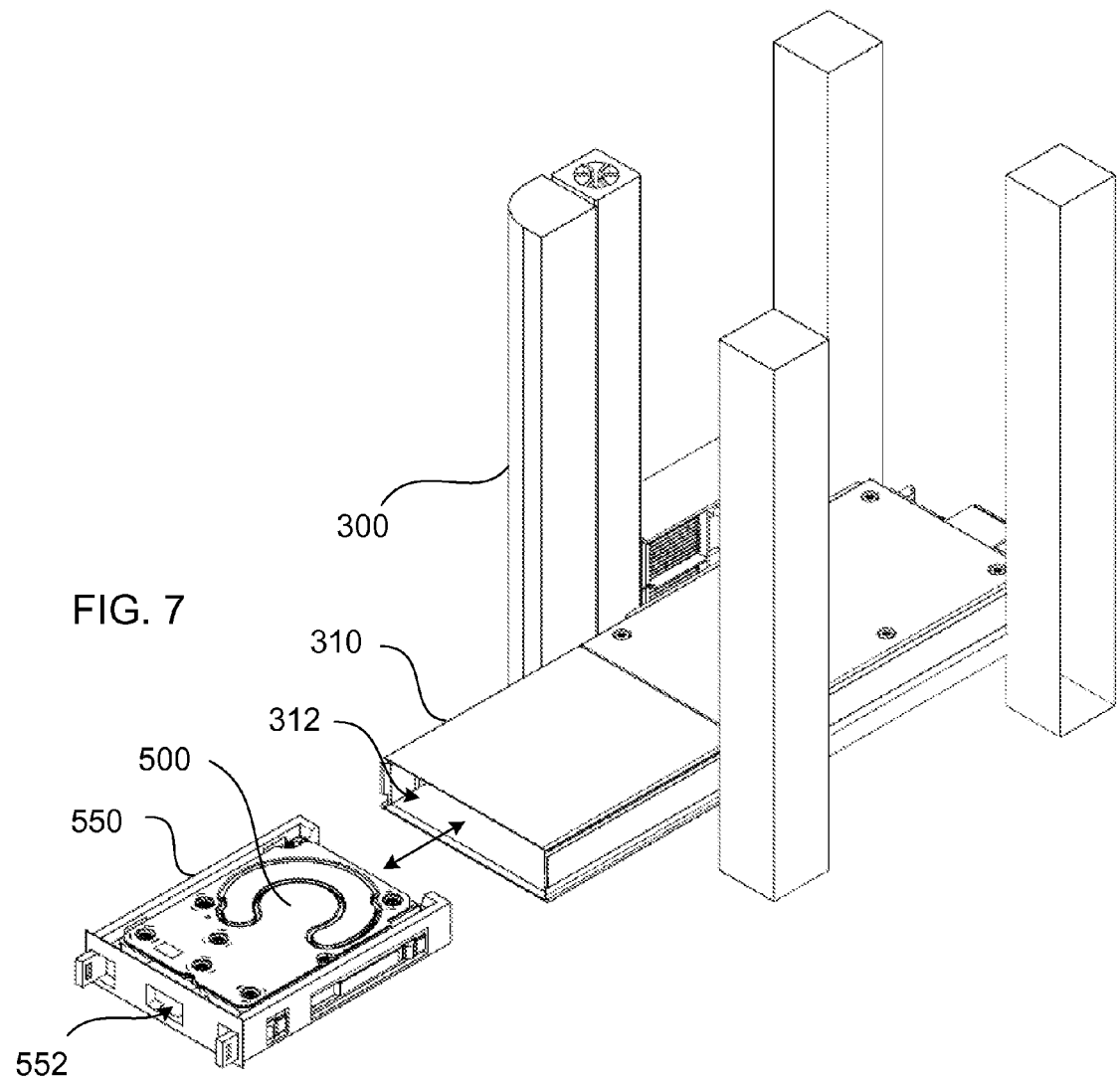
FIG. 7 is a perspective view of a storage device being inserted into a test slot of a storage device testing system.

In implementations that employ storage device transporters 550 for manipulating storage devices 500, as shown in FIG. 7, the automated transporter 200 is configured to remove a storage device transporter 550 from one of the test slots 310 with the manipulator 212, then pick up a storage device 500 from one the collections 600 presented at the transfer station 400 with the storage device transporter 550, and then return the storage device transporter 550, with a storage device 500 therein, to the test slot 310 for testing of the storage device 500. After testing, the automated transporter 200 retrieves the tested storage device 500 from the test slot 310, by removing the storage device transporter 550 carrying the tested storage device 500 from the test slot 310 (i.e., with the manipulator 212), carrying the tested storage device 500 in the storage device transporter 550 to the transfer station 400, and manipulating the storage device transporter 550 to return the tested storage device 500 to one of the collections 600 at the transfer station 400.

Figure 8:
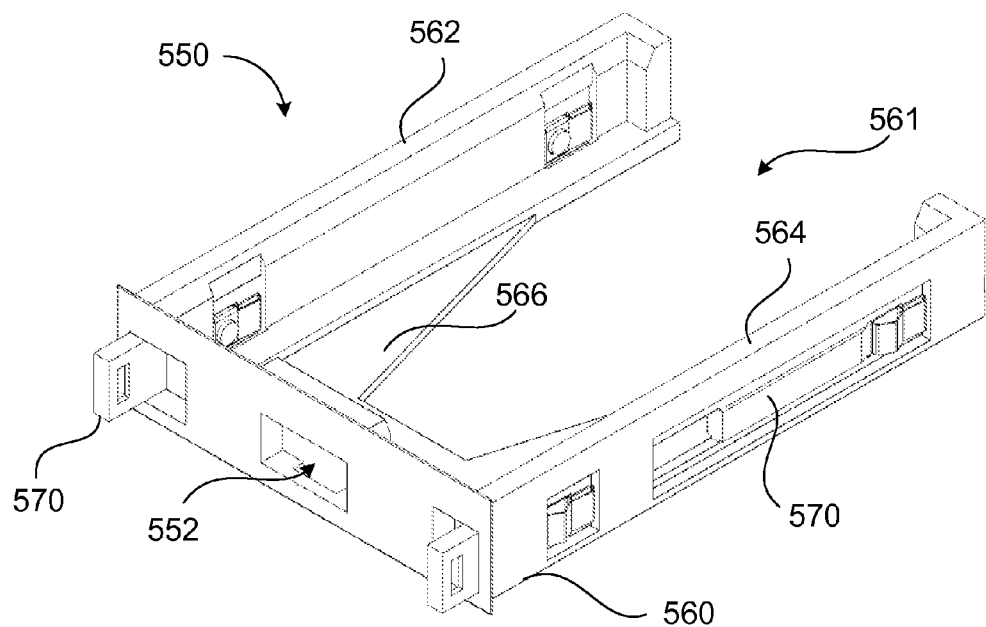
FIG. 8 is a perspective view of a storage device transporter.
Figure 9:
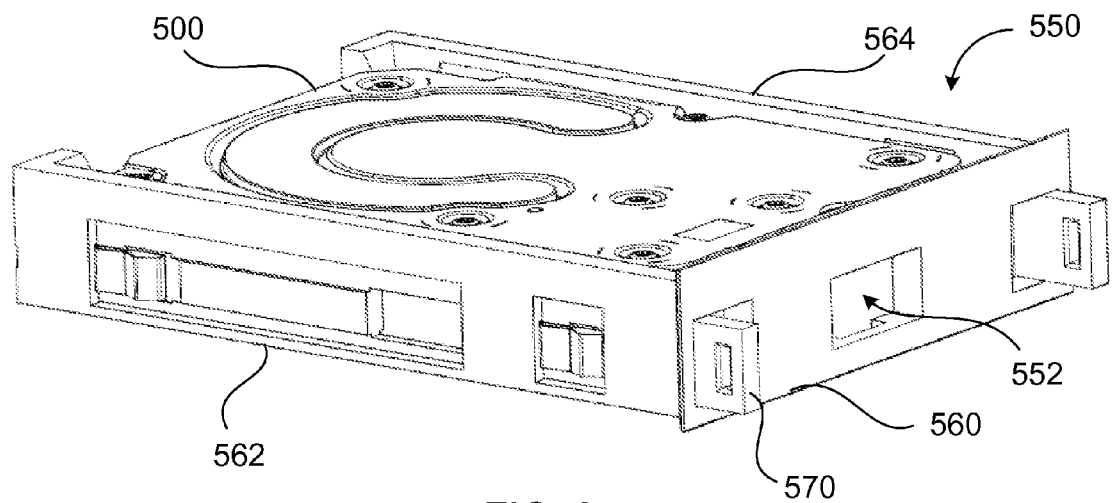
FIG. 9 is a perspective view of a storage device transporter carrying a storage device.
Figure 10:
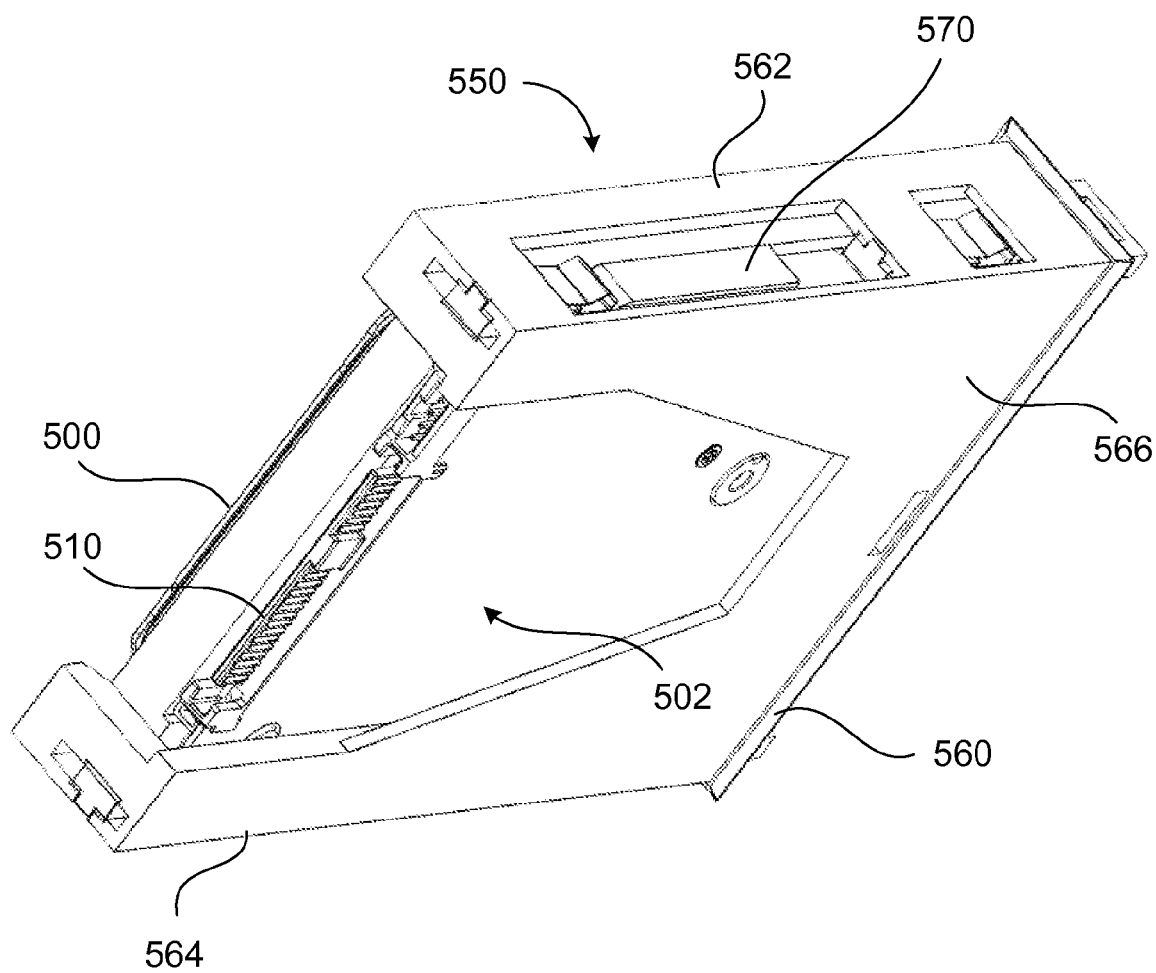
FIG. 10 is a bottom perspective view of a storage device transporter carrying a storage device.

The test slot 310, shown in FIG. 7, defines an opening 312 configured to receive the storage device transporter 550, which in this case provides closure of the test slot 310. The storage device transporter 550 is configured to receive the storage device 500, as shown in FIG. 8, and be handled by the automated transporter 200. In use, one of the storage device transporters 550 is removed from one of the test slots 310 with the robotic arm 200 (e.g., by grabbing, or otherwise engaging, the indentation 552 of the transporter 550 with the manipulator 212 of the robot 200). In some examples, as illustrated in FIGS. 8-10, the storage device transporter 550 includes a frame 560 defining a substantially U-shaped opening 561 formed by sidewalls 562, 564 and a base plate 566 that collectively allow the frame 560 to fit around a storage device support (not shown) in the collection 600 so that the storage device transporter 550 can be moved (e.g., via the robotic arm 200) into a position beneath one of the storage devices 500 housed in one of multiple storage device receptacles 620 defined by the collection 600 (see e.g., FIG. 3). The storage device transporter 550 can then be raised (e.g., by the robotic arm 200) into a position engaging the storage device 500 for removal from the collection 600.

With the storage device 500 in place within the frame 560 of the storage device transporter 550, the storage device transporter 550 and the storage device 500 together can be moved by the automated transporter 200 for placement within one of the test slots 310, as shown in FIG. 4. In some implementations, the manipulator 212 is also configured to initiate actuation of a clamping mechanism 570 disposed in the storage device transporter 550. This allows actuation of the clamping mechanism 570 before the transporter 550 is moved from the collection 600 to the test slot 310 to inhibit movement of the storage device 500 relative to the storage device transporter 550 during the move. Prior to insertion in the test slot 310, the manipulator 212 can again actuate the clamping mechanism 570 to release the storage device 500 within the frame 560. This allows for insertion of the storage device transporter 550 into one of the test slots 310, until the storage device 500 is in a test position with a storage device connector 510 engaged with a test slot connector (not shown). The clamping mechanism 570 may also be configured to engage the test slot 310, once received therein, to inhibit movement of the storage device transporter 550 relative to the test slot 310. In such implementations, once the storage device 500 is in the test position, the clamping mechanism 570 is engaged again (e.g., by the manipulator 212) to inhibit movement of the storage device transporter 550 relative to the test slot 310. The clamping of the transporter 550 in this manner can help to reduce vibrations during testing. In some examples, after insertion, the storage device transporter 550 and storage device 500 carried therein are both clamped or secured in combination or individually within the test slot 310.

A detailed description of the robotic arm 200, test slots 310 and other details and features combinable with those described herein may be found in the following U.S. patent applications, entitled "Disk Drive Testing", having assigned Ser. No. 11/958,817, entitled "Bulk Feeding Disk Drives To Disk Drive Testing Systems", having assigned Ser. No. 12/104,869, and entitled "Bulk Transfer of Storage Devices Using Manual Loading", having assigned Ser. No. 61/316,667, the entire contents of the aforementioned applications are hereby incorporated by reference.

Other embodiments are within the scope of the following claims.

What is claimed is:

1. A storage device transfer station of a storage device system, comprising:
    a plurality of slots, with a slot being capable of holding a storage device, and with the plurality of slots arranged in at least one field between two parallel planes;
    wherein a slot has a first open end and a second open end, the first open end and the second open end being accessible for loading and for unloading the storage device; and
    wherein the first open end is accessible at a first plane of the two parallel planes and the second open end is accessible at a second plane of the two parallel planes;
    wherein the storage device transfer station is a component of the storage device system, with the storage device transfer station being in proximity to (i) one or more racks of the storage device system, and (ii) an automated transporter of the storage device system, and with the storage device transfer station differing from a rack; and
    wherein the storage device transfer station is configured for feeding of storage devices to the automated transporter of the storage device system.

2. The storage device transfer station of claim 1, further comprising at least one door covering at least a portion of the first plane.

3. The storage device transfer station of claim 2, wherein the at least one door is capable of locking and unlocking.

4. The storage device transfer station of claim 3, wherein the at least one door is capable of automatic locking and unlocking.

5. The storage device transfer station of claim 1, further comprising a plurality of doors, wherein the first plane is covered by the plurality of doors.

6. The storage device transfer station of claim 1, wherein at least one of the slots is arranged to align the storage device in at least one of vertical and horizontal directions.

7. The storage device transfer station of claim 2, wherein at least one of the slots comprises a stop.

8. The storage device transfer station of claim 7, wherein the at least one door comprises a mechanism to push the storage device against the stop when the at least one door is closed.

9. The storage device transfer station of claim 1, wherein the plurality of slots are arranged to receive the storage device at the first plane from a human operator.

10. The storage device transfer station of claim 1, wherein the plurality of slots are arranged to provide the storage device at the second plane to automated machinery.

11. The storage device transfer station of claim 1, wherein the plurality of slots are arranged to prevent contact between a human operator and automated machinery.

12. The storage device transfer station of claim 1, further comprising at least one door covering at least a portion of the first plane, and configured to signal automated machinery to restrict movement while the at least one door is open.

13. The storage device transfer station of claim 1, wherein the at least one field comprises at least 125 slots.

14. The storage device transfer station of claim 1, wherein the at least one field comprises one or more vertically stacked rows.

15. A storage device testing system, comprising:
    a plurality of racks;
    a storage device transfer station comprising:
        a plurality of slots, with a slot being capable of holding a storage device, and with the plurality of slots arranged in a field between two parallel planes;
        wherein a slot has a first open end and a second open end, the first open end and the second open end being accessible for loading and for unloading the storage device; and wherein the first open end is accessible at a first plane of the two parallel planes and the second open end is accessible at a second plane of the two parallel planes; and automated machinery configured to access the second open end of the slot in the plurality of slots;

wherein the storage device transfer station is in proximity to (i) the plurality of racks of the storage device testing system, and (ii) the automated machinery of the storage device testing system, with the storage device transfer station differing from a rack; and wherein the storage device transfer station is configured for feeding of storage devices to the automated machinery of the storage device testing system.

16. The storage device testing system of claim 15, further comprising at least one door covering at least a portion of the first plane.

17. The storage device transfer station of claim 16, wherein the at least one door is configured to signal the automated machinery to restrict movement while the at least one door is open.

18. The storage device testing system of claim 16, wherein the at least one door is capable of locking and unlocking.

19. The storage device testing system of claim 18, wherein the at least one door is capable of automatic locking and unlocking.

20. The storage device testing system of claim 15, wherein the storage device transfer station further comprises a plurality of doors, and wherein the first plane is covered by the plurality of doors.

21. The storage device testing system of claim 15, wherein at least one of the slots is arranged to align the storage device in at least one of vertical and horizontal directions.

22. The storage device testing system of claim 16, wherein at least one of the slots comprises a stop.

23. The storage device testing system of claim 22, wherein the at least one door comprises a mechanism to push the storage device against the stop when the at least one door is closed.

24. The storage device testing system of claim 15, wherein the plurality of slots is arranged to receive the storage device at the first plane from a human operator.

25. The storage device transfer station of claim 15, wherein the slot is arranged to prevent contact between a human operator and the automated machinery.

26. The storage device testing system of claim 15, wherein the field comprises at least 125 slots.

27. The storage device testing system of claim 15, wherein the field comprises one or more vertically stacked rows.

28. The storage device transfer station of claim 1, wherein the first open end and the second open end being accessible for loading and for unloading the storage device comprises:
the first open end and the second open end each being accessible for loading and for unloading multiple storage devices simultaneously at a same time.

29. The storage device transfer station of claim 1, further comprising:
an access port allowing an operator to load a plurality of first storage devices into the storage device system and to unload a plurality of second storage devices from the storage device system.

* * * * *